United States Patent
Kumar et al.

(10) Patent No.: US 10,417,257 B2
(45) Date of Patent: Sep. 17, 2019

(54) NON-BLOCKING DATABASE TABLE ALTERATION

(71) Applicant: Oracle International Corporation, Redwood Shores, CA (US)

(72) Inventors: Ramesh Kumar, Foster City, CA (US); Ananth Raghavan, San Francisco, CA (US); George Eadon, Hollis, NH (US)

(73) Assignee: Oracle International Corporation, Redwood Shores, CA (US)

( * ) Notice: Subject to any disclaimer, the term of this patent is extended or adjusted under 35 U.S.C. 154(b) by 324 days.

(21) Appl. No.: 15/267,540

(22) Filed: Sep. 16, 2016

(65) Prior Publication Data

US 2017/0116241 A1  Apr. 27, 2017

Related U.S. Application Data

(60) Provisional application No. 62/244,672, filed on Oct. 21, 2015.

(51) Int. Cl.
*G06F 16/27* (2019.01)
*G06F 16/21* (2019.01)

(52) U.S. Cl.
CPC .......... *G06F 16/278* (2019.01); *G06F 16/214* (2019.01)

(58) Field of Classification Search
CPC .............. G06F 17/30584; G06F 17/303; G06F 16/278; G06F 16/214
See application file for complete search history.

(56) References Cited

U.S. PATENT DOCUMENTS

| | | | |
|---|---|---|---|
| 7,644,106 B2 | 1/2010 | Shankar et al. | |
| 8,041,691 B2 | 10/2011 | Raghavan et al. | |
| 8,195,702 B2 | 6/2012 | Shankar et al. | |
| 2005/0125430 A1* | 6/2005 | Souder | G06F 17/30575 |
| 2008/0098045 A1* | 4/2008 | Radhakrishnan | G06F 17/30551 |
| 2009/0037417 A1* | 2/2009 | Shankar | G06F 17/30362 |
| 2009/0300075 A1* | 12/2009 | Guan | G06F 17/30575 |
| 2015/0347401 A1 | 12/2015 | Raghavan et al. | |
| 2017/0109377 A1 | 4/2017 | Baer et al. | |

* cited by examiner

*Primary Examiner* — Kris E Mackes
*Assistant Examiner* — Lin Lin M Htay
(74) *Attorney, Agent, or Firm* — Vista IP Law Group, LLP

(57) ABSTRACT

Systems for managing large database systems. Storage devices hold a set of one or more subject database tables that hold subject data accessed by one or more users. A data definition statement to perform a table alteration operation (e.g., a table partition operation) over a particular table in the subject database is received, parsed, and the table alteration operation over the particular table is initiated. During the processing of the data definition statement to complete the table alteration operation, a data manipulation statement to perform a table access operation over the same table is received and parsed. The data manipulation statement is not blocked, even while the table alteration operations are ongoing. Rather, during the time that the table alteration operations are ongoing, the data manipulation statement is processed using hidden tables. After the table alteration operations have completed, incoming data manipulation statements are performed over the altered database tables.

17 Claims, 11 Drawing Sheets

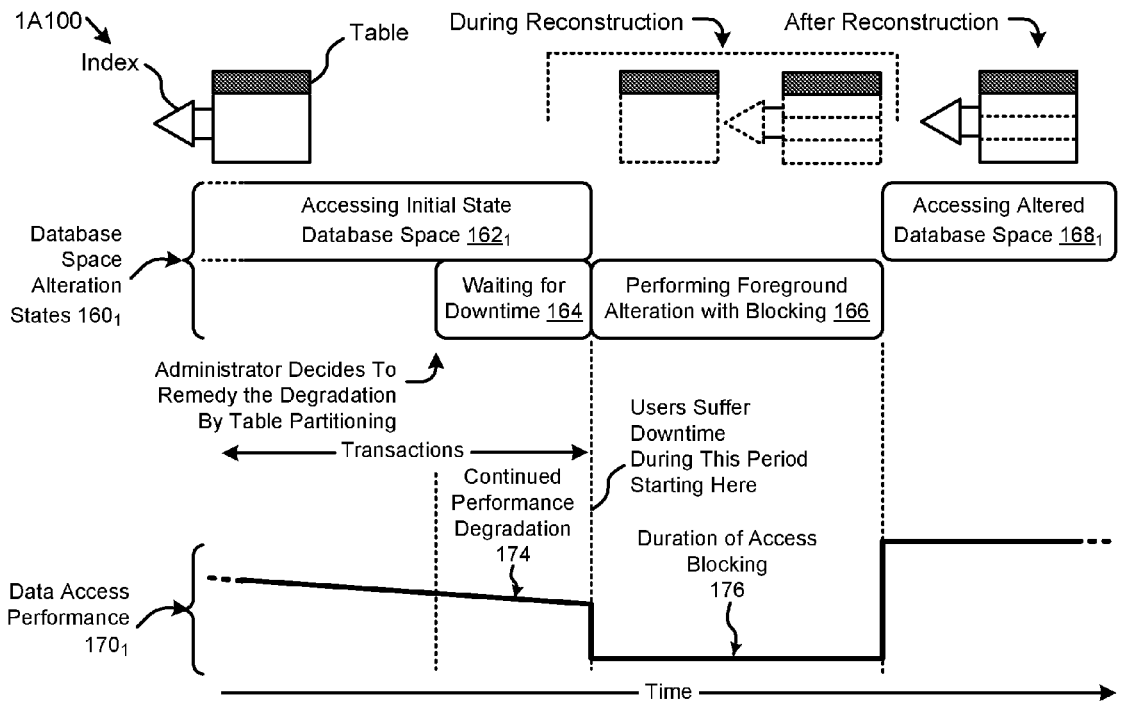
FIG. 1A1
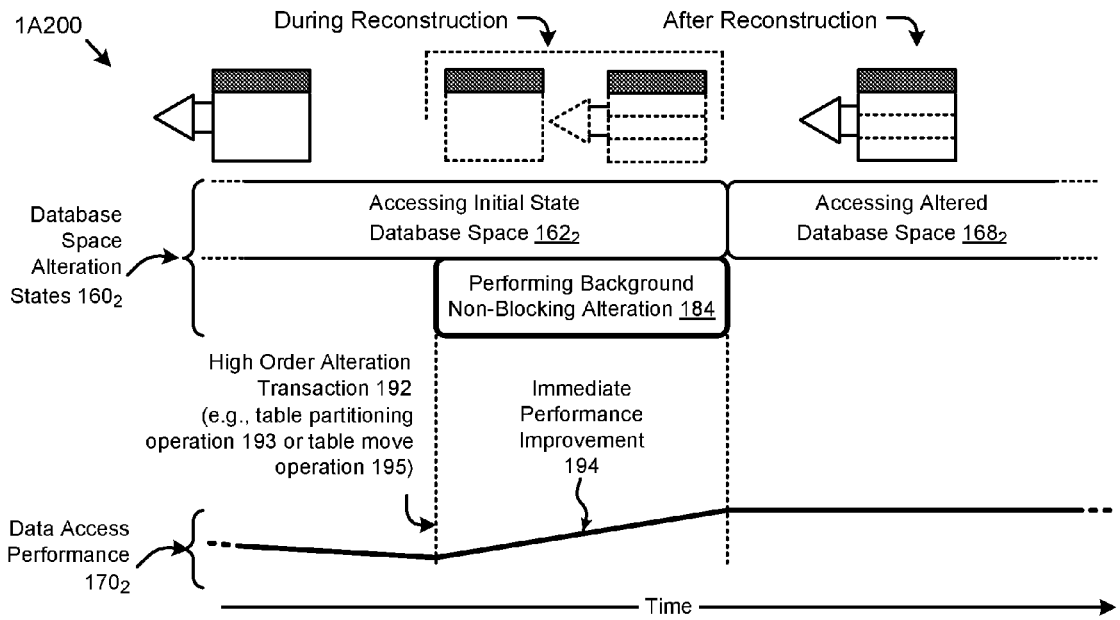
FIG. 1A2

NON-BLOCKING DATABASE TABLE ALTERATION

RELATED APPLICATIONS

The present application claims the benefit of priority to co-pending U.S. Provisional Patent Application Ser. No. 62/244,672 titled, "ABILITY TO ALTER A NON-PARTITIONED TABLE TO PARTITIONED STATE IN OFFLINE AND ONLINE MODE AND ABILITY TO MOVE A TABLE ONLINE", filed Oct. 21, 2015, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to managing very large databases, and more particularly to techniques for performing non-blocking database table alterations.

BACKGROUND

Today's enterprises often deploy mission-critical databases that can comprise several hundred gigabytes, and often several terabytes of data. The support and maintenance requirements of such very large databases (VLDBs) can be challenging. Certain strategies for managing VLDBs include database object partitioning. Partitioning addresses size and other issues for supporting very large tables and/or indexes of VLDBs. Partitioning decomposes large tables into more manageable (e.g., smaller) pieces (e.g., partitions).

When using partitions, queries and/or data manipulation language (DML) statements can access partitioned tables and/or partitioned indexes as if referring to the non-partitioned table. On an ongoing basis, data definition language (DDL) statements can access and/or manipulate individual partitions rather than having to manipulate entire tables and/or indexes. Such partitioning offers several advantages to users of VLDBs. For example, the latency for certain operations (e.g., data loads, index creation, etc.) and/or queries can be significantly reduced since such operations and/or queries operate over the smaller sets of partitioned data and/or respective indexes. Other benefits might also be enabled by partitioning, such as enhanced availability of mission-critical databases, increased resource utilization, and/or other benefits. In some cases, partitioning might entail moving one or more data tables from one physical storage location to another physical storage location in a distributed storage environment so as to improve access performance and/or storage resource utilization.

Unfortunately, legacy techniques for creating partitioned data tables and/or indexes can introduce unwanted downtime or other DML, access blocking. Specifically, certain legacy approaches might lock out DML accesses during partitioning or movement of an initial state database space to an altered (e.g., partitioned or moved) state. In legacy situations such a downtime period or blocking period might become long. In some legacy cases, the downtime period or blocking period becomes very long, at least inasmuch as the totality of partitioning operations (e.g., partition a non-partitioned table, repartition a partitioned data table, move a partitioned table to another physical storage location, regenerate respective new instances of index tables and/or auxiliary attribute tables, regenerate affected constraints, triggers, etc.) often demands a significant amount of processing power and processing time.

Some legacy approaches require explicit synchronization operations (e.g., lockout operations) to be observed when partitioning. For example, during an alteration period, users might be prohibited from accessing either the original subject table or the partitioned tables during the entirety of the period. Further, some legacy approaches require the user to determine the partitioning strategy and/or construct the multiple DDL statements for executing the partitioning strategy.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The drawings described below are for illustration purposes only. The drawings are not intended to limit the scope of the present disclosure.

FIG. 1A1 illustrates a blocking database space restructuring technique.

FIG. 1A2 illustrates a non-blocking database space restructuring technique as implemented in systems that support non-blocking database table alteration, according to some embodiments.

FIG. 2 depicts a series of table partitioning states encountered when implementing techniques for non-blocking database table alteration, according to an embodiment.

DETAILED DESCRIPTION

Figure 1B:
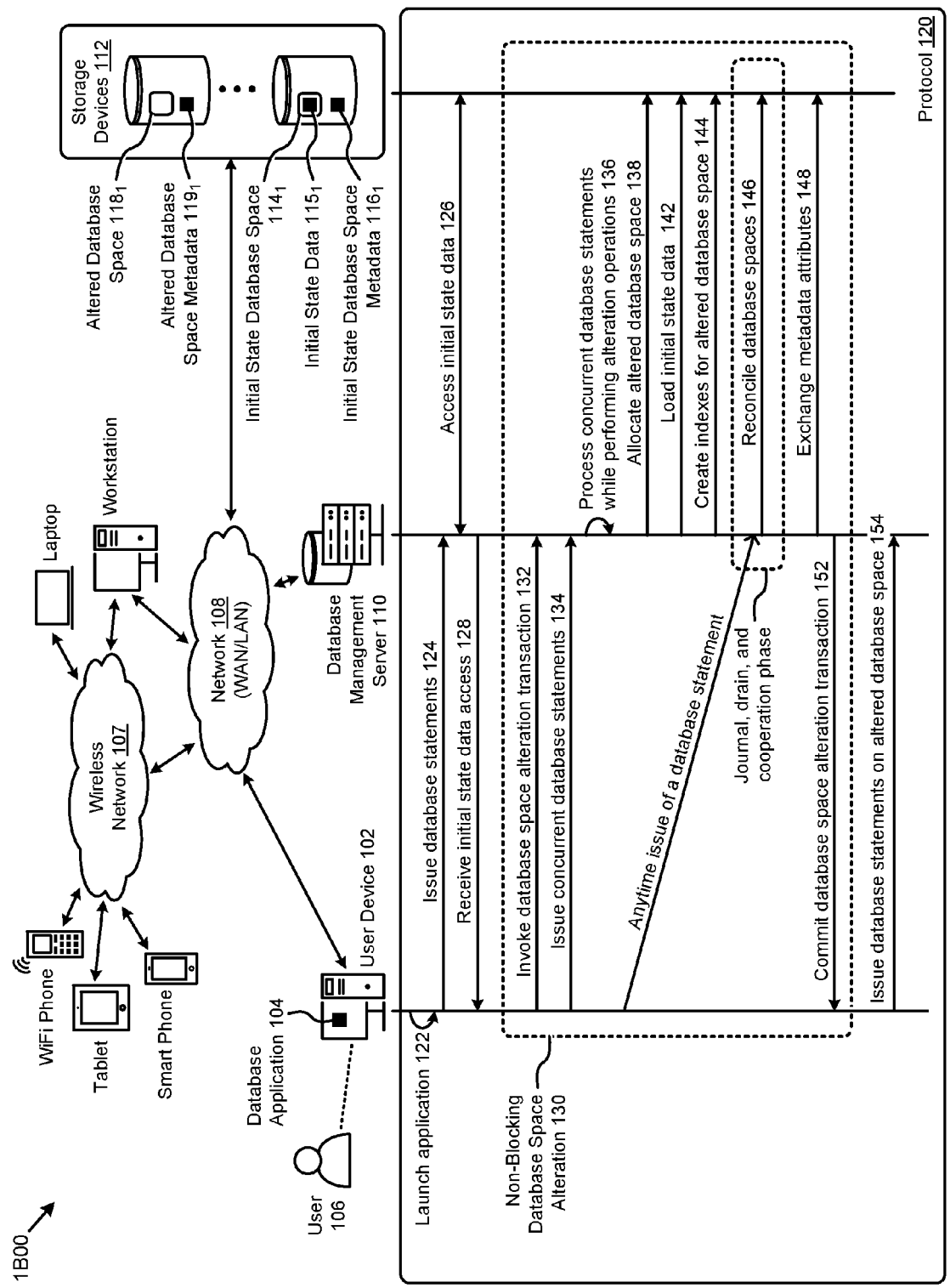
FIG. 1B exemplifies an environment that supports a protocol for non-blocking database table alteration, according to an embodiment.

Some embodiments of the present disclosure address the problem of database access performance degradation during certain database restructuring operations, such as partitioning operations. Some embodiments are directed to approaches for implementing algorithms invoked by high order database statements to facilitate non-disruptive non-blocking database alteration (e.g., table partitioning, table moving, etc.) using hidden database structures. The accompanying figures and discussions herein present example environments, systems, methods, and computer program products for non-blocking database table alteration.

Overview

The herein disclosed techniques include algorithms invoked by high order database statements to facilitate non-disruptive, non-blocking database alteration (e.g., table partitioning, table moving, etc.) using hidden database structures. In some embodiments, the algorithms can be invoked by a database definition statement to perform a background table partitioning transaction by creating a hidden partitioned data table that is a clone of a subject data table that was identified for partitioning. In some embodiments, subject data from the subject data table can be directly loaded into the hidden partitioned data table as part of the table partitioning transaction.

Implementations of background table partitioning using hidden tables facilitates users to continue processing database statements over the subject data table even during the table partitioning operations. Hidden table metadata associated with the hidden partitioned data table can be created to characterize the structure (e.g., partitions) of the hidden data table. In certain embodiments, various attributes from the hidden table metadata, and subject table metadata associated with the subject data table, can be exchanged to maintain data synchronization, and to facilitate switching user access from the subject data table to its altered state (e.g., partitioned or moved) data table. In some embodiments, various hidden indexes associated with the hidden partitioned data table can also be created in the background to facilitate conversion of any indexes on the subject data table to indexes associated with the altered state data tables. In some cases, certain characteristics (e.g., local access, global access, etc.) of the partitioned indexes can be determined and acted upon by algorithms implemented according to the herein disclosed techniques.

In some embodiments, the algorithms can be invoked by a high order database statement so as to perform a background table alteration by creating a hidden data segment to receive subject data from a subject data table.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXAMPLE EMBODIMENTS

FIG. 1A1 illustrates a blocking database space restructuring technique 1A100. The database space restructuring technique 1A100 shown in FIG. 1A1 depicts a sequence of database space alteration states $160_1$ and a representative metric (e.g., throughput) of a data access performance $170_1$ over time. The shown sequence of database space alteration states $160_1$ commences at a state corresponding to accessing an initial state database space (state $162_1$). A user might want to access one or more subject data tables having various associated subject indexes. In some cases, the data access performance $170_1$ can degrade over time due to, for example, an increase in the size of the subject data tables. In such cases, a user or database administrator might decide to restructure the database to improve performance. A database alteration transaction might be invoked to partition one or more tables and/or indexes in the initial state database space. In this case, the user might need to determine various attributes (e.g., partition sizes, index types, index prefixes, etc.) pertaining to the desired new structure. The user may further need to determine the most effective combination of low order statements (e.g., DDL statements, DML statements, SQL queries, etc.), data locks, and/or other components that can serve to carry out the database alteration transaction. When performance degrades to a noticeable effect, an administrator might decide to remedy the degradation by table partitioning. The table partitioning can be done during a period of scheduled downtime, or can be done while users are locked-out. Regardless of whether the table partitioning is performed during a locked-out period during scheduled downtime, or is performed while users are otherwise locked-out, the users suffer downtime. The duration might be long (e.g., see duration of access blocking 176) while the table or tables are reconstructed to apply the partitioning.

In some cases, the duration of blocked access might significantly impact overall user-perceived performance. In certain other cases, the alteration transaction (e.g., to apply the partitioning to the table) might not be executed until the next expected downtime such as downtime for scheduled maintenance. As such, users might experience continued degradation of performance while waiting for scheduled maintenance to perform the table alteration (state 164), and then experience further deleterious effects during the downtime.

During the time before applying the partitioning to the table, a continued performance degradation 174 can occur. Performance degradation can worsen for example as the already large data tables continue to grow. At some moment in time (e.g., during period 166), the alteration transaction can be performed.

Continuing, as illustrated in FIG. 1A1, certain legacy approaches might issue an access block 176 and/or enforce lockout-states while performing such a blocking alteration. In such cases, users might be prohibited from accessing either the original initial state database space or the altered database space during a lockout and/or synchronization period. Further, such legacy approaches can require the rebuilding of indexes and/or auxiliary functions which can consume additional computing and/or storage resources, as well as potentially increasing the blocked access period. When the altered database space and all associated information (e.g., indexes, metadata, auxiliary attributes, etc.) have been constructed, the altered database space can be unlocked for access (state $168_1$), and a corresponding improved level of data access performance $170_1$ can be realized.

Figure 2:
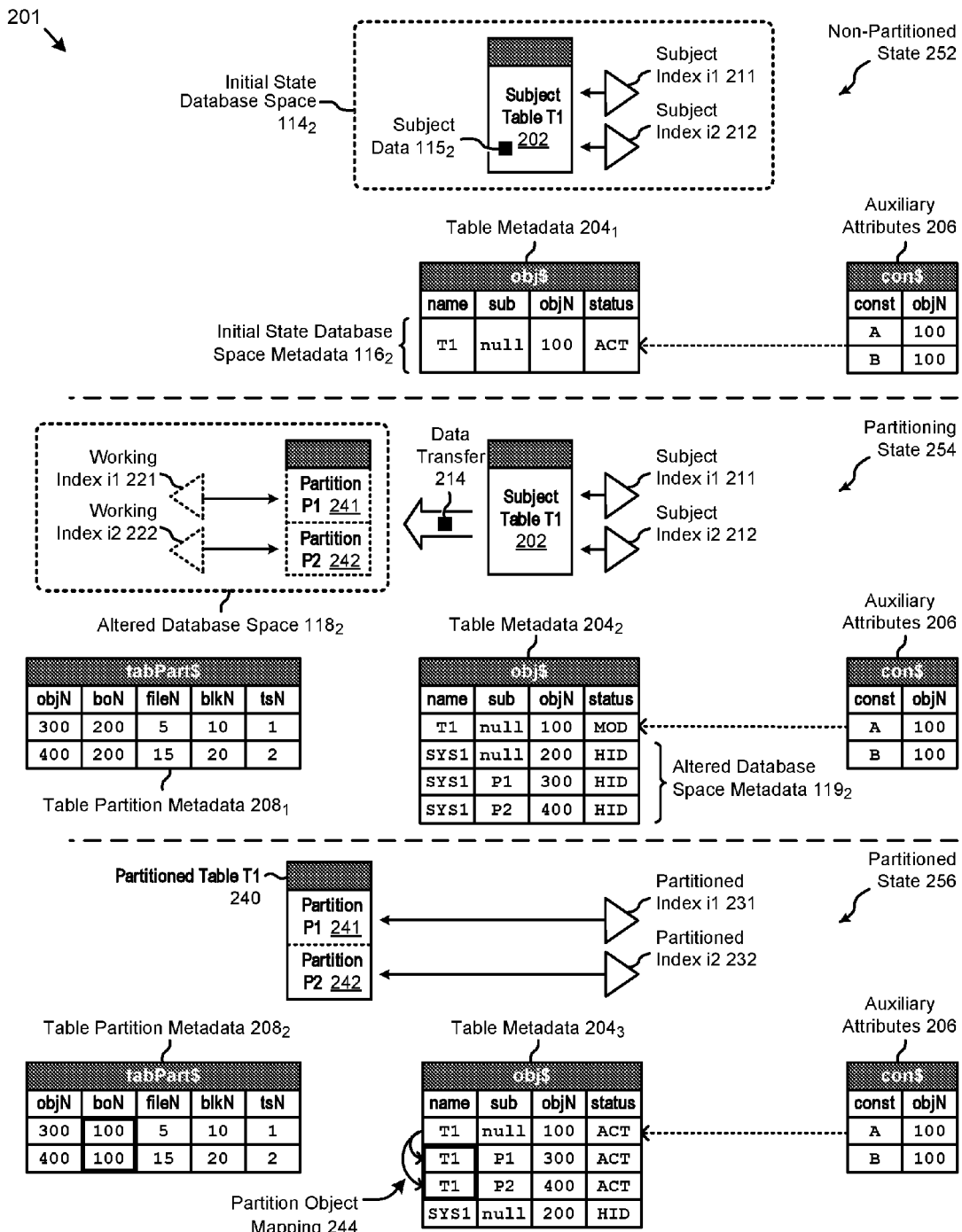

Using the herein disclosed techniques, blocking or locking database space restructuring techniques can be replaced by non-blocking database space restructuring techniques as shown and described as pertaining to FIG. 1A2.

FIG. 1A2 illustrates a non-blocking database space restructuring technique 1A200 as implemented in systems that support non-blocking database table alteration. As an option, one or more variations of non-blocking database space restructuring technique 1A200 or any aspect thereof may be implemented in the context of the architecture and functionality of the embodiments described herein. The non-blocking database space restructuring technique 1A200 or any aspect thereof may be implemented in any environment.

The non-blocking database space restructuring technique 1A200 illustrates certain attributes characterizing some embodiments of the herein disclosed techniques for non-blocking database table alteration. The non-blocking database space restructuring technique 1A200 depicts a sequence of non-blocking database space alteration states $160_2$ and a representative metric (e.g., throughput) of a data access performance $170_2$ over time. Specifically, the shown sequence of non-blocking database space alteration states $160_2$ can commence with a state corresponding to accessing an initial state database space (state $162_2$). For example, a user might access during this state one or more subject data tables having various associated subject indexes.

In some cases, the data access performance $170_2$ can decline over time due to, for example, an increase in size of the subject data tables. A user might decide to restructure the database to improve performance. Specifically, using the herein disclosed techniques, a high order alteration transaction 192 might be invoked to, for example, partition one or more tables and/or indexes in the initial state database space. In this case, the user might merely need to issue a single database statement to invoke the transaction. In some cases, certain parameters (e.g., partition size, etc.) pertaining to the desired altered structure might be included in the statement invoking the high order alteration transaction 192. In other cases, the high order alteration transaction 192 might automatically determine certain parameters (e.g., index type). Further, the low order statements (e.g., DDL statements, DML statements, SQL queries, etc.), data locks, and/or other components that serve to carry out the high order alteration transaction 192 can be transparent to the user.

According to the herein disclosed techniques, the high order alteration transaction 192 (e.g., a table partitioning operation 193 or a table move operation 195) can be performed in the background in a non-blocking manner (state 184). More specifically, a user can continue accessing the initial state database space (state $162_2$) to perform create, read, update, and/or delete (CRUD) or other data manipulation statements concurrent with the generation of the altered database space by the background alteration transaction. In such cases, the user might experience an immediate performance improvement 194 as various instances of the high order alteration transaction 192 are executed. For example, a user accessing multiple data tables might benefit from various table partitioning operations and/or table move operations implemented in the background according to the herein disclosed techniques. When the altered database space is prepared, user data access can be transitioned from the initial state database space to the altered database space (state $168_2$), resulting in a corresponding improved level of data access performance $170_2$.

Several technological improvements, including those described in the foregoing, can be facilitated by the herein disclosed techniques. As an example, many users access non-partitioned tables that might be determined to be partitioned to improve various partitioning advantages such as availability, manageability, and/or performance. The herein disclosed techniques provide a high order (e.g., single step DDL statement) alteration transaction capability that can, for example, convert the non-partitioned tables to partitioned tables. In some embodiments, such transactions can be executed in an offline mode and/or an online mode as might be required for various use scenarios. Further, the high order transaction can also convert any indexes on the non-partitioned data table to partitioned indexes on the partitioned data table. Further, the herein disclosed techniques enable certain auxiliary functions (e.g., customer-specified constraints, triggers, permissions, etc.) that are widely used across various applications to be directly applied (e.g., without modification) to the altered (e.g., partitioned, moved, etc.) database structure.

One embodiment of an environment and protocol supporting the herein disclosed techniques is shown in FIG. 3.

FIG. 1B exemplifies an environment 1B00 that supports a protocol for non-blocking database table alteration. As an option, one or more variations of environment 1B00 or any aspect thereof may be implemented in the context of the architecture and functionality of the embodiments described herein. The environment 1B00 or any aspect thereof may be implemented in any environment.

As shown in FIG. 1B, the environment 1B00 comprises various computing systems (e.g., servers and devices) interconnected by a wireless network 107 and a network 108. The wireless network 107 and the network 108 can comprise any combination of a wide area network (e.g., WAN), local area network (e.g., LAN), cellular network, wireless LAN (e.g., WLAN), or any such means to facilitate communications among computing systems. The wireless network 107 and the network 108 can also collectively be referred to as the Internet. More specifically, environment 1B00 can comprise at least one instance of the database management server 110 and at least one instance of the storage devices 112. The servers and storage devices shown in environment 1B00 can represent any single computing system with dedicated hardware and software, multiple computing systems clustered together (e.g., a server farm, a host farm, etc.), a portion of shared resources on one or more computing systems (e.g., a virtual server), or any combination thereof. For example, the database management server 110 and the storage devices 112 can comprise a database back-end accessible by one or more users (e.g., enterprise users) operating a user device.

Specifically, the environment 1B00 can further comprise instances of user devices (e.g., user device 102) that can represent one of a variety of other computing devices (e.g., a smart phone, a tablet, a WiFi phone, a laptop, a workstation, etc.) having software (e.g., operating system, applications, etc.) and hardware (e.g., a graphics processing unit, display, monitor, etc.) capable of processing and displaying information (e.g., web page, graphical user interface, etc.) on a display. The user devices can further communicate information (e.g., web page request, user activity, electronic files, computer files, etc.) over the wireless network 107 and the network 108. As shown, the user device 102 can be operated by a user 106. The user device 102 might have installed one or more applications (e.g., that can manage database information) represented by the database application 104. The shown storage devices 112 include an initial state database space $114_1$ comprising a set of subject data $115_1$ (characterized by a set of initial state database space metadata $116_1$), and an altered database space (e.g., altered database space $118_1$ that is characterized by an allocation of altered database space metadata $119_1$).

As shown, the user device 102, the database management server 110, and the storage devices 112 can exhibit a set of high order interactions (e.g., operations, messages, etc.) in a protocol 120. Specifically, and as shown, the database application 104 can be launched at the user device 102 (operation 122) to facilitate issuing various database statements to the database management server 110 (message 124). In response to the database statements, the database management server 110 can access the subject data $115_1$ from the initial state database space $114_1$ (message 126). For example, the initial state database space $114_1$ might be logically structured as a non-partitioned data table in one or more instances of the storage devices 112. The foregoing interactions can allow the user 106 (e.g., through the database application 104 operating on the user device 102) to perform accesses to the subject data (message 128).

According to the herein disclosed techniques, a non-blocking database space alteration can be implemented in the environment 1B00 as shown (grouping 130). Specifically, the user 106 at the user device 102 might invoke a database space alteration transaction at the database management server 110 (message 132). For example the database space alteration transaction might comprise a single high order statement to convert a non-partitioned data table in the initial state database space $114_1$ to a partitioned state. As earlier described, the herein disclosed techniques facilitate issuing concurrent database transactions while the database space alteration transaction is executing (message 134). More specifically, the database management server 110 can process such concurrent database statements while performing various low order alteration operations associated with the database space alteration transaction (operation 136). For example, certain database statements for operating on the initial state database space $114_1$ can be processed concurrently with alteration transactions associated with the initial state database space $114_1$, thus facilitating a non-blocking database space alteration capability.

As shown, in certain embodiments, the aforementioned low order alteration operations might include allocating the altered database space $118_1$ in the storage devices 112 (message 138). For certain alteration transactions, the subject data $115_1$ from the initial state database space $114_1$ can be directly loaded to the altered database space $118_1$ (message 142). For example, to partition a non-partitioned table, or repartition a partitioned table, the subject data $115_1$ can be directly loaded into the specified partitions of the altered database space $118_1$. As another example, to merely move a table, the subject data $115_1$ can be moved from the initial state database space $114_1$ to the altered database space $118_1$.

In some cases, working indexes on the altered database space $118_1$ can be created (message 144) such that the created indexes correspond to the nature of the database structures formed by the partitioning or movement operations. For example, the working indexes might be used to convert indexes associated with the initial state database space $114_1$ to be associated with the target altered space. The low order alteration operations associated with the alteration transaction might also include reconciling the initial state database space $114_1$ and the altered database space $118_1$ (message 146, and see discussions of journaling and cooperation phase herein). Further, certain metadata associated with the various database spaces can be exchanged (message 148) to facilitate transitioning from the source database space (e.g., non-partitioned table) to the target altered database space (e.g., partitioned data table). For example, certain attributes (e.g., an object number, an object identifier, a repository identifier, a base object number, a name, etc.) from the initial state database space metadata $116_1$ characterizing the initial state database space $114_1$ and the altered database space metadata $119_1$ characterizing the altered database space $118_1$ can be exchanged to facilitate an operating of the database statements on the altered database space $118_1$. As shown, a commit of the database space alteration transaction sent from the database management server 110 to the user device 102 (message 152) can enable such issuing of database statements on the altered database space (message 154).

Specific applications of the database space restructuring and/or alteration facilitated by the herein disclosed techniques can include data table partitioning, data table moving, and/or other applications. One such data table partitioning approach is described in FIG. 2, according to certain embodiments.

FIG. 2 depicts a series of table partitioning states 201 encountered when implementing techniques for non-blocking database table alteration. As an option, one or more variations of table partitioning states 201 or any aspect thereof may be implemented in the context of the architecture and functionality of the embodiments described herein. The table partitioning states 201 or any aspect thereof may be implemented in any environment.

The table partitioning states 201 depict various states (e.g., a non-partitioned state 252, a partitioning state 254, and a partitioned state 256) associated with a table partitioning approach using the herein disclosed techniques. Specifically, the non-partitioned state 252 can include an initial state database space $114_2$ comprising a subject table T1 202 storing a set of subject data $115_2$. The initial state database space $114_2$ can further have a subject index i1 211 and a subject index i2 212 associated with the subject table T1 202. As an example, the subject table T1 202 might be a non-partitioned table that has been identified for partitioning. The pseudo-code shown in Table 1 might be used to create the foregoing database structures and invoke the table partitioning transaction, according to some embodiments. For example, lines 0-8 might create the foregoing subject table T1 and indexes i1 and i2. In some cases, a column created with a primary key attribute can implicitly create an index on that column.

TABLE 1

Data table partitioning pseudo-code, Example 1

| Ref | Pseudo-Code |
|---|---|
| 0 | /* Subject Data Table (non-partitioned) */ |
| 1 | CREATE table T1 ( |
| 2 |   a int, |
| 3 |   b int, |
| 4 |   c int invisible, |
| 5 |   d as (a+b)); |
| 6 | /* Subject Indexes (non-partitioned) */ |
| 7 | CREATE index i1 on T1(a); |
| 8 | CREATE index i2 on T2(b); |
| 9 | /* Single Statement Alteration (to partitioned state) */ |
| 10 | ALTER subject table T1 modify |
| 11 |   PARTITION by range (a) ( |
| 12 |     PARTITION P1 values less than (10), |
| 13 |     PARTITION P2 values less than (maxValue)) |
| 14 |   ONLINE |
| 15 | /* Convert Indexes (to partitioned state) */ |
| 16 | UPDATE indexes ( |
| 17 |   i1 local, |
| 18 |   i2 global partition by hash(b) partitions 3); |

As shown in FIG. 2, an instance of table metadata $204_1$ can further include certain attributes comprising a set of initial state database space metadata $116_2$. For example, the initial state database space metadata $116_2$ might describe the subject table T1 202 as having a "name" T1, a "sub" name that is empty or null, an object number "objN" of 100, a "status" of ACT or active, and/or other attributes. The subject table T1 202 can further be associated with a set of auxiliary attributes 206 linked to subject table T1 202. For example, the object number 100 might associate a constraint A and/or a constraint B in the auxiliary attributes 206 to the subject table T1 202. In some cases, such auxiliary attributes can be established by a user to apply to any given database space.

In certain embodiments, the herein disclosed techniques can be implemented to partition the subject table T1 202. In such cases, the components illustrated in the partitioning state 254 might represent various information pertaining to a certain moment in time of a high order table partitioning transaction facilitated by the herein disclosed techniques. For example, such a high order table partitioning transaction might be invoked by the single statement comprising lines 10-14 in Table 1. Specifically, such a statement might create an altered database space $118_2$ that comprises a partition P1 241 and a partition P2 242. In some cases (e.g., as shown in Table 1), merely a partition schema might only be required to be specified in the single high order statement. In most cases, no column mapping and/or columns need to be specified in the statement. In some embodiments, the table comprising the partition P1 241 and the partition P2 242 is a clone of the subject table T1 202 at least as pertains to the column properties, the column orderings, and/or other characteristics of the original table. Specifically, column properties pertaining to large object datatypes (e.g., LOBs), encrypted columns, invisible columns, virtual expression columns, long varchar (e.g., 32K) columns, fast added columns with default value, and/or other column properties can be retained in the clone. The high order statement can also be interpreted using standard database access interfaces and/or languages (e.g., SQL DDL statements).

In some embodiments, a working index i1 221 and a working index i2 222 might also be created. In certain embodiments, the partitions and the indexes in the altered database space $118_2$ can be hidden. In such cases, the altered database space $118_2$ might be accessible by a database management system (e.g., operating on a database management server), but not accessible by database statements issued by a user (e.g., from an application on a user device). The components comprising the altered database space $118_2$ can be characterized by a set of altered database space metadata $119_2$ included in an instance of the table metadata $204_2$. Specifically, the altered database space $118_2$ might be identified by a "name" SYS1, a "sub" name that is empty or null, an "objN" object number of 200, a "status" of HID or hidden, and/or other attributes, in the table metadata $204_2$. The partitions P1 and P2 might further be characterized in the table metadata $204_2$ as shown (e.g., see "sub" names). Other attributes pertaining to the partitions might further be captured in a set of table partition metadata $208_1$. For example, the "boN" or base object number of the partitions are shown to refer to the object number 200 corresponding to the altered database space $118_2$ while in the partitioning state 254. In some cases, a certain portion of the foregoing attributes associated with the altered database space $118_2$ can be system generated attributes.

According to the herein disclosed techniques, the high order table partitioning transaction can be executed without blocking access to the initial state database space $114_2$. Specifically, the components comprising the altered database space $118_2$ can be allocated and/or created to receive a data transfer 214 from the subject table T1 202 while concurrent database statements can be issued for operating on the subject table T1 202, subject index i1 211, and/or subject index i2 212. Further, the auxiliary attributes 206 can continue to be applied to such subject data accesses. In some cases, the subject table T1 202 might be marked as having a "status" of MOD or being modified in the table metadata $204_2$. For example, the MOD status might be used to facilitate certain journaling that might be required for the table partitioning transaction.

When the aforementioned high order table partitioning transaction is complete (e.g., committed), the partitioned state 256 can be reached. Specifically, the partitioned state 256 depicts the partition P1 241 and the partition P2 242 comprising a partitioned table T1 240 being active (e.g., visible) for receiving database statements from users. The subject data access transition from the subject table T1 202 in the partitioning state 254 and/or earlier states to the partitioned table T1 240 in the partitioned state 256 can be facilitated, in part, by an exchange of certain attributes in the table metadata, the table partition metadata, and/or other metadata (e.g., index metadata, dictionaries, etc.). Specifically, for example, the "name" attributes associated with the partitions can be swapped from SYS1 in the table metadata $204_2$ to T1 in the table metadata $204_3$. Further, for example, the "boN" attribute associated with the partitions can be swapped from 200 in the table partition metadata $208_1$ to 100 in the table partition metadata $208_2$. In such cases, any database statements issued on the subject table T1 202, including any application of the auxiliary attributes 206, can operate on the partitioned table T1 240. In some embodiments, a partition object mapping 244 using the table metadata 204₃ can redirect such database statements to the partitions comprising partitioned table T1 240 according to the statement parameters.

The metadata exchange and/or other operations can further generate a partitioned index i1 231 and a partitioned index i2 232 derived, in part, from the working index i1 221 and the working index i2 222, respectively, where the partitioned index i1 231 and the partitioned index i2 232 can serve as partitioned instances of the subject index i1 211 and the subject index i2 212, respectively. In some cases, certain attributes (e.g., partitioning schema) of the partitioned indexes can be specified in an index update statement that can accompany the high order table partitioning transaction statement. For example, one such index update statement is depicted in lines 15-18 in Table 1. In other cases, certain attributes (e.g., index type, such as local, global, etc.) can be automatically generated in an update index transaction by the herein disclosed techniques. In these cases, a high order index update statement (e.g., UPDATE indexes;) can invoke the automatic update. In other cases, partial indexes on the table being converted to a partitioned state can be created.

One aspect of the herein disclosed techniques is that the object number (e.g., 100) of the source table (e.g., subject table T1 202) is retained in the altered database structure (e.g., partitioned table T1 240). This aspect facilitates use of the auxiliary structures (e.g., auxiliary attributes 206) such as, triggers, constraints, materialized views, grants, virtual private database settings, permissions, policies, and/or other attributes on the altered (e.g., partitioned) database space with no disruption for the user and/or user applications. Further, the high order table partitioning transaction (e.g., invoked by a single DDL statement) can work in a non-blocking manner when specified with an "online" option. The high order table partitioning transaction can also work using an "offline" option when, for example, customers desire to perform the alteration in a downtime window. Statistics can be automatically collected on the partitioned table (e.g., partition-level statistics) during the table partitioning transaction.

Figure 3A:
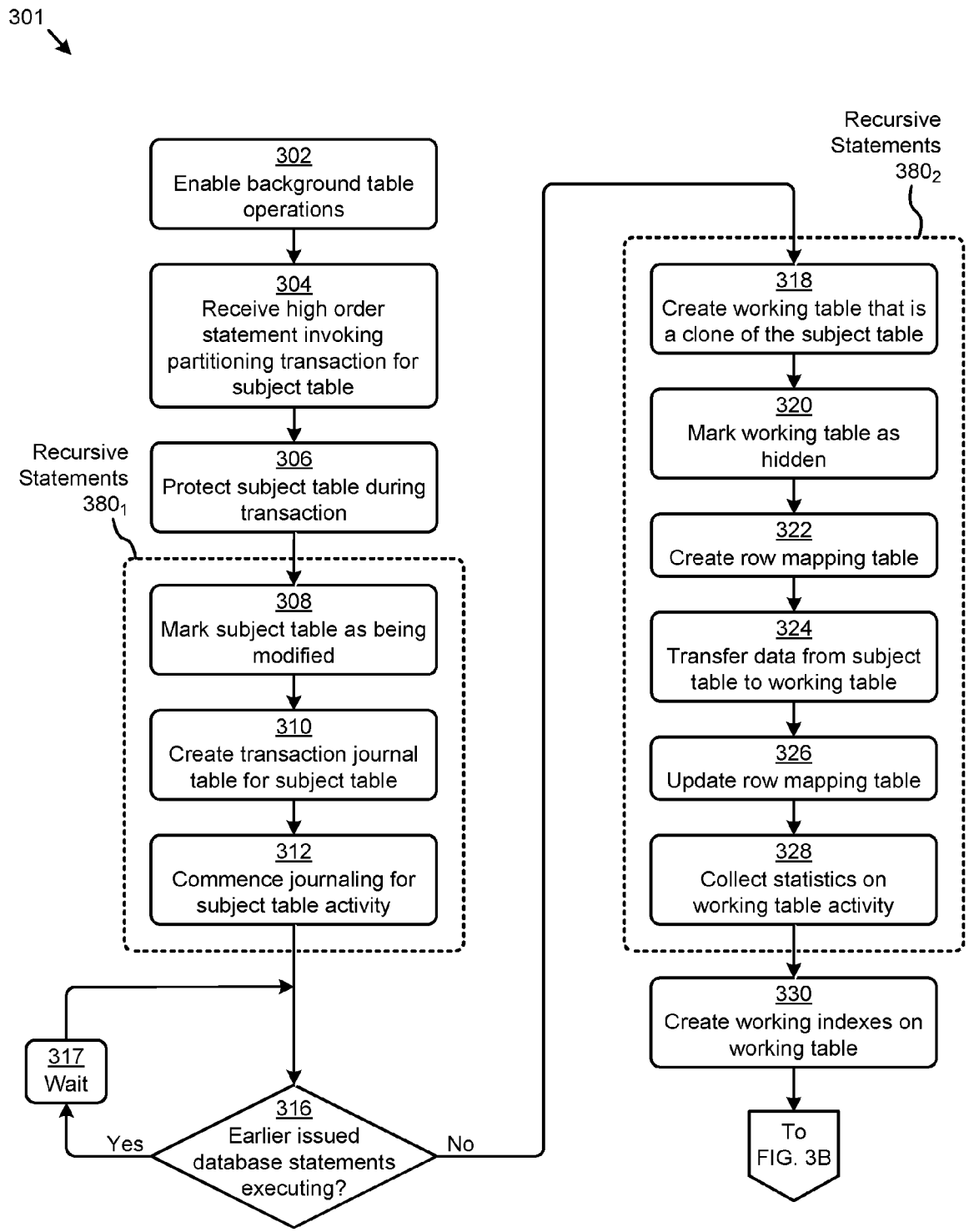
FIG. 3A and FIG. 3B present a table partitioning technique as implemented in systems that perform non-blocking database table alteration, according to an embodiment.
Figure 3B:
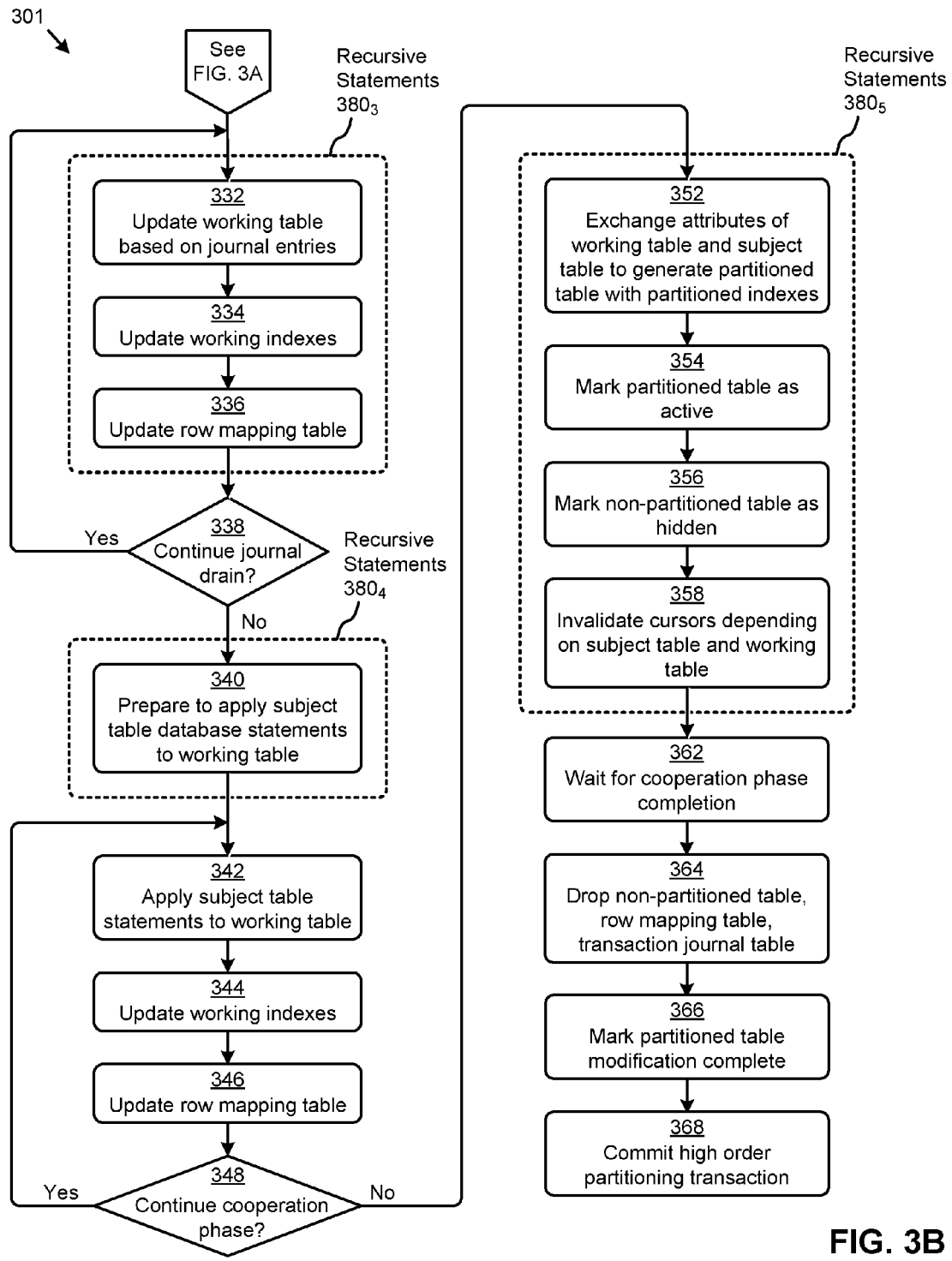

Further details pertaining to a table partitioning technique facilitated by the herein disclosed techniques are described in FIG. 3A and FIG. 3B.

FIG. 3A and FIG. 3B present a table partitioning technique 301 as implemented in systems that perform non-blocking database table alteration. As an option, one or more variations of table partitioning technique 301 or any aspect thereof may be implemented in the context of the architecture and functionality of the embodiments described herein. The table partitioning technique 301 or any aspect thereof may be implemented in any environment.

FIG. 3A presents one embodiment of a set of steps and/or operations for partitioning a data table using the herein disclosed techniques for non-blocking database table alteration. In one or more embodiments, the steps and underlying operations shown in FIG. 3A can be executed by program instructions stored on a database management server, such as the database management server 110 described in FIG. 1B. Specifically, the flow in FIG. 3A can commence with enabling certain background table operations (at step 302). For example, changes to parser code at the database management server might be implemented to facilitate internal execution of certain table modify operations. A high order statement invoking a table partitioning transaction for a subject table might then be received (at step 304). For example, Table 2 presents example pseudo-code that includes such a high order statement (e.g., see lines 10-15). Various portions of the pseudo-code in Table 2 will be used herein for reference. In some cases, the subject table might be a non-partitioned table to be converted to a partitioned state. In other cases, the subject table might be a partitioned table to be repartitioned.

TABLE 2

Data table partitioning pseudo-code, Example 2

| Ref | Pseudo-Code |
|---|---|
| 0 | /* Subject Data Table (non-partitioned) */ |
| 1 | CREATE table EMP ( |
| 2 |   empNo number not null, |
| 3 |   eName varchar2 (10), |
| 4 |   job varchar2 (9), |
| 5 |   sal number (7, 2) invisible); |
| 6 | /* Subject Indexes (non-partitioned) */ |
| 7 | CREATE index i1_sal on EMP (sal) tbs_1; |
| 8 | CREATE unique index i2_empNo on EMP (empNo) tbs_2; |
| 9 | CREATE index i3_mgr on EMP (mgr) tbs_1; |
| 10 | /* Single Statement Alteration (to partitioned state) */ |
| 11 | ALTER table EMP modify |
| 12 | PARTITION by range (empNo) interval (100) ( |
| 13 |   PARTITION P1 values less than (100), |
| 14 |   PARTITION P2 values less than (500)) |
| 15 | ONLINE; |

Upon invoking the table partitioning transaction for the subject table, certain protections pertaining to the subject table can be implemented (at step 306). For example, a sub-exclusive or SX DML lock and/or an exclusive or X DDL enqueue on the subject table might be implemented to, in part, prevent other online DDL transactions on the subject table. In most cases, the SX lock can allow other transactions to query, insert, update, delete, and/or lock rows concurrently on the subject table. Further, SX locks can allow multiple transactions to obtain concurrent SX and/or sub-share or SS locks for the subject table.

The table partitioning transaction can continue with a set of recursive statements $380_1$ for executing variation operations. Specifically, the recursive statements $380_1$ can serve to mark the subject table as being modified (at step 308). Specifically, for example, certain metadata might be updated to indicate the subject table is being modified online to a partitioned state. Further, a transaction journal can be created for the subject table (at step 310). For example, the journal table might capture the row identifier (e.g., r owl D) and opcode of various processes associated with the subject table. The recursive statements $380_1$ can be committed when the subject table has been marked to commence journaling of subject table activity (at step 312). For example, any DML statements pertaining to the subject table can be captured in the journal table. In some cases, certain database statements (e.g., DML statements) might have been issued prior to the invoking of the table partitioning transaction. If one or more of such database transactions are still executing (see "Yes" path of decision 316), a wait period can be implemented (at step 317) until the execution of such database statements has completed (see "No" path of decision 316).

The table partitioning transaction can continue with a set of recursive statements $380_2$ for executing variation operations. Specifically, the recursive statements $380_2$ can serve to create an internal working table that is a clone of the subject table (at step 318). For example, the working table can be a partitioned table comprising the column structure of the subject table, but with partition specifications as specified by the user (see pseudo-code lines 12-14 in Table 2). More specifically, in certain embodiments, a "clone" of the subject table might be characterized by the created working table (e.g., partitioned table) and the subject table having the same column numberings. In this case, the working table and the subject table can have the same intcol#, segcol#, and/or col#. Such clones of the subject table can further accommodate various types of columns, such as virtual expression columns, invisible columns, encrypted columns, statistics expression columns, 32K varchar columns, and/or other column types. In some cases, the working partitioned table can have a system-generated name (e.g., SYS1,SYS_OD-PART_97829,etc.).

The recursive statements $380_2$ might further serve to mark the working table as hidden (at step 320). For example, a hidden status can disallow certain queries and/or DDL statements on the hidden working table. Further, in some cases, no direct DML statements will be allowed on the hidden working table. To facilitate the transfer of data from the subject table to the working table, a row mapping table can be created (at step 322). For example, the row mapping table might have a first column for the source table rowID and a second column for the corresponding working table rowID. As data is transferred (e.g., by row, groups of rows, etc.) from the subject table to the working table (at step 324), the row mapping table can be updated (at step 326). The efficiency of lookups on the row mapping table can be improved by maintaining an index on the row mapping table. In some cases, for example, a direct load from the subject table to the working table can be implemented. In such cases, certain types of compression and/or clustering can be transferred to the working table. Further, in certain embodiments, statistics pertaining to the working table can be collected during the data transfer (at step 328). For example, such statistics can facilitate efficient execution of database statements on the altered (e.g., partitioned) database space following the completion of the table partitioning transaction.

When the recursive statements $380_2$ are committed, working indexes on the working table can be created (at step 330). In some cases, the working indexes can be created using concurrent (e.g., parallel) recursive transactions comprising CREATE index statements. In other cases, certain logic can automatically determine the index partitioning type (e.g., local, global, etc.). For example, if the index prefix matches the partitioning column, then the index can be determined to be a local index. Otherwise, the index can be a global index. Partial indexes can also be supported. The structure of the working indexes can also be derived in part from the user specifications (e.g., lines 6-9 in Table 2). In certain embodiments, the working indexes can be hidden and/or given a system-generated name. As such, both the working table and corresponding working indexes can be hidden and not available for user issued queries (e.g., DML, statements). However, in such cases, the working table and/or working indexes can be accessed internally to carry out various operations pertaining to the table partitioning transaction.

Referring now to FIG. 3B, the figure presents one embodiment of a set of steps and/or operations for partitioning a data table using the herein disclosed techniques for non-blocking database table alteration. In one or more embodiments, the steps and underlying operations shown in FIG. 3B can be executed by program instructions stored on a database management server, such as the database management server 110 described in FIG. 1B. Table 2 presents example pseudo-code that includes a high order statement (e.g., see lines 10-15) that can invoke a table partitioning transaction that might include the steps and/or operations shown in FIG. 3B. Various portions of the pseudo-code in Table 2 will be used herein for reference.

Specifically, as shown in FIG. 3B, the table partitioning transaction can continue with a set of recursive statements $380_3$ for executing variation operations. Specifically, the recursive statements $380_3$ can serve to update the working table based on the journal entries (at step 332). For example, recursive SQL statements can be used to delete from and/or insert into the working table based on the contents of the journal table. Example pseudo-code representing such delete and insert operations are shown in Table 3. In some cases, certain rows might be designated as locked in the journal, resulting in updates for such locked rows being ignored. In certain embodiments, the working indexes associated with the working table can also be maintained responsive to any working table updates (at step 334). Further, the row mapping table can be maintained responsive to any working table updates (at step 336).

TABLE 3

Working table update pseudo-code example

| Ref | Pseudo-Code |
|---|---|
| 0 | /* Insert Data Into Working Table */ |
| 1 | INSERT into <working table> |
| 2 |   SELECT * from <subject table> |
| 3 |   WHERE rowID =: <rowID from journal>; |
| 4 | /* Delete Data From Working Table */ |
| 5 | DELETE from <working table> |
| 6 |   WHERE rowID = ( |
| 7 |     SELECT <working table rowID> from <row mapping table> |
| 8 |     WHERE <subject table rowID> =: <rowID from journal>); |

The "journal drain" facilitated by the recursive statements $380_3$ can be repeated (see "Yes" path of decision 338) until the working table and any associated working indexes are synchronized with the subject table and any associated subject indexes. In some cases, the number of rows processed in each iteration of the recursive statements $380_3$ can be actively managed to maximize transaction efficiency. When no further journal drain iterations are needed (see "No" path of decision 338), the final instance of the recursive statements $380_3$ can be committed. A set of recursive statements $380_4$ might then commence to prepare to apply subject table database statements to the working table (at step 340). Such preparation can comprise, for example, making certain dictionary (e.g., table metadata) changes to indicate that database statements (e.g., DML, statements) on the subject table should also be applied to the working table. In some cases, journaling of such database statements applied to the subject table and the working table can be disabled to, for example, eliminate continued journal growth that might prevent the table partitioning transaction from completing.

The recursive statements $380_4$ can then be committed to launch a "cooperation phase" that can commence with subject table database statements being applied to the working table (at step 342). For example, database statements (e.g., DML, statements) issued on the subject table can be internally applied to the working table using a certain setting (e.g., "_use_hidden_partitions"). In some cases, any database statements that might negate a journal entry can cause the journal entry to be deleted. Further, the working indexes (e.g., unique indexes, non-unique indexes, etc.) and the row mapping table can be maintained during the cooperation phase (at step 344 and step 346, respectively). While user database statements on the subject table can be applied to the working table during the cooperation phase, the working table and associated working indexes remain hidden, preventing the user from issuing database statements directly on the working table. In certain cases, the cooperation phase can continue (see "Yes" path of decision 348) until all working table updates based on journal entries have been completed (e.g., the journal has been "drained"). In some cases, the cooperation phase might continue until updates associated with certain locked rows have been processed.

When the cooperation phase is complete (see "No" path of decision 348), a set of recursive statements $380_5$ can be used to execute variation operations. Specifically, the recursive statements $380_5$ can serve to exchange certain attributes of the working table and working indexes with certain attributes of the subject table and subject indexes, so as to generate a partitioned table with partitioned indexes (at step 352). For example, dictionary changes (e.g., table metadata changes) to swap the names of the source table and working table can be implemented by the recursive statements. Other dictionary changes (e.g., index table changes) to swap the names of the source indexes and working indexes can also be implemented by the recursive statements. Further, in some embodiments, the object number of the working table and working indexes can be replaced with the object number of the subject table and subject indexes respectively, to produce a partitioned table and partitioned indexes having the object number of the subject table and subject indexes, respectively. In this case, certain database statements configured to operate on the subject table and/or subject indexes can be applied to the partitioned table and/or partitioned indexes. Further, certain auxiliary objects (e.g., constraints, triggers, etc.) configured for the subject table and/or subject indexes can also be applied to the partitioned table and/or partitioned indexes. In some cases, the partitioned table can be marked as active (e.g., from hidden) (at step 354). Also, the subject table can be marked as hidden (e.g., from active) (at step 356). In certain embodiments, certain cursors depending on the subject table and/or working table can be invalidated (at step 358).

Referring to the parameters associated with the pseudo-code statements in Table 2, the foregoing steps can result in table EMP logically mapping to the partitioned table and the internally created working table (e.g., SYS1) logically mapping to the subject table. Also, the index i1_sal can become a local partitioned index, the index i2_empNo can become a global partitioned index, and the index i3_mgr can become a local partitioned index. Further, table EMP and all associated indexes can be visible (e.g., active, not hidden) for access as a partitioned table with partitioned indexes. More specifically, user issued database statements (e.g., queries, DML statements, etc.) can be applied to the foregoing partitioned table and/or partitioned indexes. Further, the partitioned indexes can be maintained responsive to such database statements.

After all database statements (e.g., DML, statements) issued during the cooperation phase have completed (at step 362), the subject table (e.g., non-partitioned table), the row mapping table, and the transaction journal table can be dropped (at step 364). The partitioned table can also be marked (e.g., in table metadata) to indicate that the table modification is complete (at step 366). The high order table partitioning transaction can then be committed (at step 368). For example, the commit might comprise releasing table locks, signaling user applications, cleaning up failures, and/or other operations associated with the completion of the table partitioning transaction.

While the foregoing describes an implementation of the herein disclosed techniques to perform non-blocking table partitioning transactions, other database space alteration transactions can be implemented using the herein disclosed techniques. One such transaction might pertain to moving one or more data tables, such as is shown and described in FIG. 4.

Figure 4:
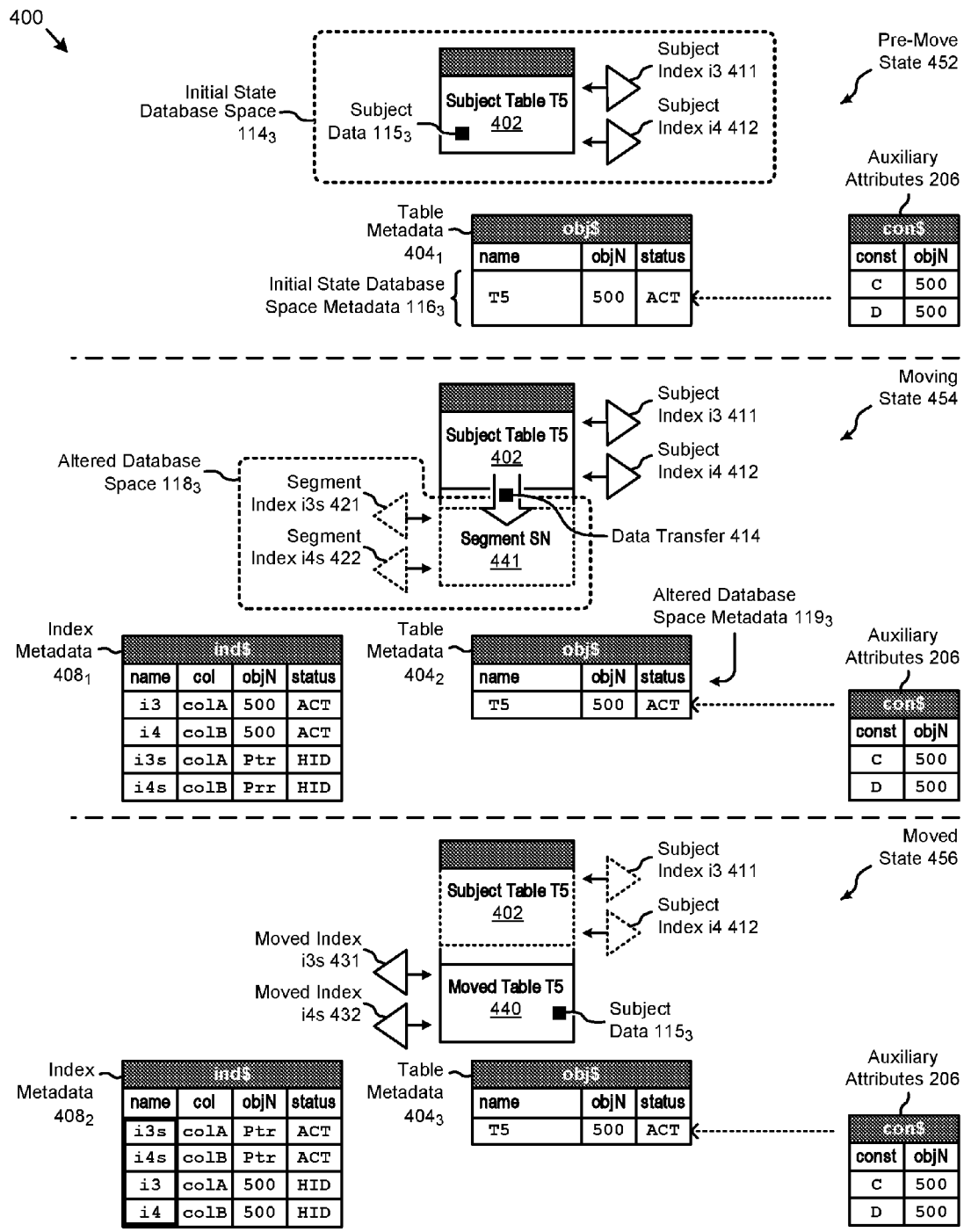
FIG. 4 depicts a set of table move operation states as facilitated by techniques for non-blocking database table alteration, according to some embodiments.

FIG. 4 depicts a set of table move operation states 400 as facilitated by techniques for non-blocking database table alteration. As an option, one or more variations of table move operation states 400 or any aspect thereof may be implemented in the context of the architecture and functionality of the embodiments described herein. The table move operation states 400 or any aspect thereof may be implemented in any environment.

The table move operation states 400 depict various states (e.g., a pre-move state 452, a moving state 454, and a moved state 456) associated with a table move approach using the herein disclosed techniques. Specifically, the pre-move state 452 can include an initial state database space $114_3$ comprising a subject table T5 402 storing a set of subject data $115_3$. In some cases, the subject data $115_3$ might be stored in a segment of the subject table T5 402. The initial state database space $114_3$ can further have a subject index i3 411 and a subject index i4 412 associated with the subject table T5 402. As an example, the subject table T5 402 might be a data table that has been identified for moving. The pseudo-code shown in Table 4 might be used to create the foregoing database structures and invoke the table move transaction, according to some embodiments. For example, lines 0-8 might create the foregoing subject table T5 and indexes i3 and i4.

TABLE 4

Data table move pseudo-code example

| Ref | Pseudo-Code |
|---|---|
| 0 | /* Subject Data Table */ |
| 1 | CREATE subject table T5 ( |
| 2 | colA int, |
| 3 | colB int; |
| 4 | colC int invisible, |
| 5 | colD as (a+b)); |
| 6 | /* Subject Indexes */ |
| 7 | CREATE index i3 on T5(colA); |
| 8 | CREATE index i4 on T5(colB); |
| 9 | /* Single Statement Alteration (table move) */ |
| 10 | ALTER table T5 move ( |
| 11 | COMPRESS tablespace tbs_2) |
| 12 | ONLINE; |
| 13 | /* Update Indexes */ |
| 14 | UPDATE indexes; |

As shown in FIG. 4, an instance of table metadata $404_1$ can further include certain attributes comprising a set of initial state database space metadata $116_3$. For example, the initial state database space metadata $116_3$ might describe the subject table T5 402 as having a "name" T5, a "sub" name of s1 (e.g., segment 1), an "objN" object number of 500, a "status" of ACT or active, and/or other attributes. The subject table T5 402 can further be associated with a set of auxiliary attributes 206 linked to subject table T5 402. For example, the object number 500 might associate a constraint C and/or a constraint D in the auxiliary attributes 206 to the subject table T5 402.

In certain embodiments, the herein disclosed techniques can be implemented to move the subject table T5 402. In such cases, the components illustrated in the moving state 454 might represent various information pertaining to a certain moment in time of a high order table move transaction facilitated by the herein disclosed techniques. For example, such a high order table move transaction might be invoked by the single statement comprising lines 9-12 in Table 4. Specifically, such a statement might create an altered database space $118_3$ that comprises a segment SN 441. In some cases, a new table might not be created for the segment SN 441. For example, as shown, the segment SN 441 might have a logical relationship with the subject table T5 402. In some embodiments, a segment index i3s 421 and a segment index i4s 422 might also be created. In certain embodiments, the segment and the indexes in the altered database space $118_3$ can be hidden. In such cases, the altered database space $118_3$ might be accessible by a database management system (e.g., operating on a database management server), but not accessible by database statements issued by a user (e.g., from an application on a user device).

The components comprising the altered database space $118_3$ can be characterized, in part, by a set of altered database space metadata $119_3$ included in an instance of the table metadata $404_2$. Specifically, for example, the segment SN 441 might have a "status" attribute and/or other attributes in its respective metadata. The segment index i3s 421 and the segment index i4s 422 might be characterized in its set of index metadata $408_1$. For example, the "objN" object number of the segment indexes are shown to refer to a data space corresponding to the hidden segment SN 441.

As shown, in some cases, the created segment indexes (e.g., segment index i3s 421 and segment index i4s 422) can index the same columns (e.g., colA and colB, respectively) as the subject indexes (e.g., subject index i3 411 and subject index i4 412). In such cases, the herein disclosed techniques can facilitate generation of indexes on the same set of columns when at least one other index property associated with the indexes is different at a given moment in time. For example, the subject index i3 411 and the segment index i3s 421 both index on colA, but the subject index i3 411 is visible or active (e.g., status=ACT) while the segment index i3s 421 is hidden (e.g., status=HID). In some cases, a certain portion of the foregoing attributes associated with the altered database space $118_3$ can be system generated.

According to the herein disclosed techniques, the high order table move transaction can be executed without blocking access to the initial state database space $114_3$. Specifically, the components comprising the altered database space $118_3$ can be allocated and/or created to receive a data transfer 414 from the subject table T5 402 while concurrent database statements can be issued for operating on the subject table T5 402, subject index i3 411, and/or subject index i4 412. Further, the auxiliary attributes 206 can continue to be applied to such subject data accesses. In some cases, the subject table T5 402 might be marked as having a "status" of MOD or being modified in the table metadata $404_2$. For example, the MOD status might be used to facilitate certain journaling that might be required for the table move transaction.

When the aforementioned high order table move transaction is complete (e.g., committed), the moved state 456 can be reached. Specifically, the moved state 456 depicts the segment SN 441 converted to a moved table T5 440 that is active (e.g., visible) for receiving database statements from users. The subject data access transition from the subject table T5 402 in the moving state 454 and/or earlier states to the moved table T5 440 in the moved state 456 can be facilitated, in part, by an exchange of certain attributes in the table metadata, the index metadata, and/or other metadata (e.g., dictionaries, etc.). Specifically, for example, the "ObjN" base object number attribute associated with the segment SN 441 can be swapped from 600 in the table metadata $404_2$ to 500 in the table metadata $404_3$. In such cases, any database statements issued on the subject table T5 402, including any application of the auxiliary attributes 206, can operate on the moved table T5 440. As shown, the subject table T5 402 and associated subject indexes can be hidden (e.g., status=HID) in the moved state 456.

The metadata exchange and/or other operations can further generate a moved index i3s 431 and a moved index i4s 432, which are derived, in part, from the segment index i3s 421 and the segment index i4s 422, respectively, where the moved index i3s 431 and the moved index i4s 432 can serve as moved instances of the subject index i3 411 and the subject index i4 412, respectively. Specifically, for example, the "name" attribute associated with the segment indexes can be swapped from being associated with objN=600 in the index metadata $408_1$ to being associated with objN=500 in the index metadata $408_2$. In some cases, certain attributes of the moved indexes can be specified in an index update statement that can accompany the high order table move transaction statement. In other cases, certain attributes (e.g., index type such as local, global, etc.) can be automatically generated in an update index transaction by the herein disclosed techniques. For example, one such index update statement for auto-generating certain index parameters is depicted in lines 13-14 in Table 4.

One aspect of the herein disclosed techniques is that the object number (e.g., 500) of the source table (e.g., subject table T5 402) is retained in the altered database structure (e.g., moved table T5 440). This aspect facilitates use of the auxiliary structures (e.g., auxiliary attributes 206) such as, triggers, constraints, materialized views, grants, virtual private database settings, permissions, policies, and/or other attributes on the altered (e.g., moved) database space with no disruption for the user and/or user applications. Further, the high order table move transaction (e.g., invoked by a single DDL statement) can work in a non-blocking manner when specified with an "online" option. The high order table move transaction can also work using an "offline" option when, for example, customers desire to perform the alteration in a downtime window. Also, statistics can be automatically collected on the moved table during the table move transaction.

Figure 5A:
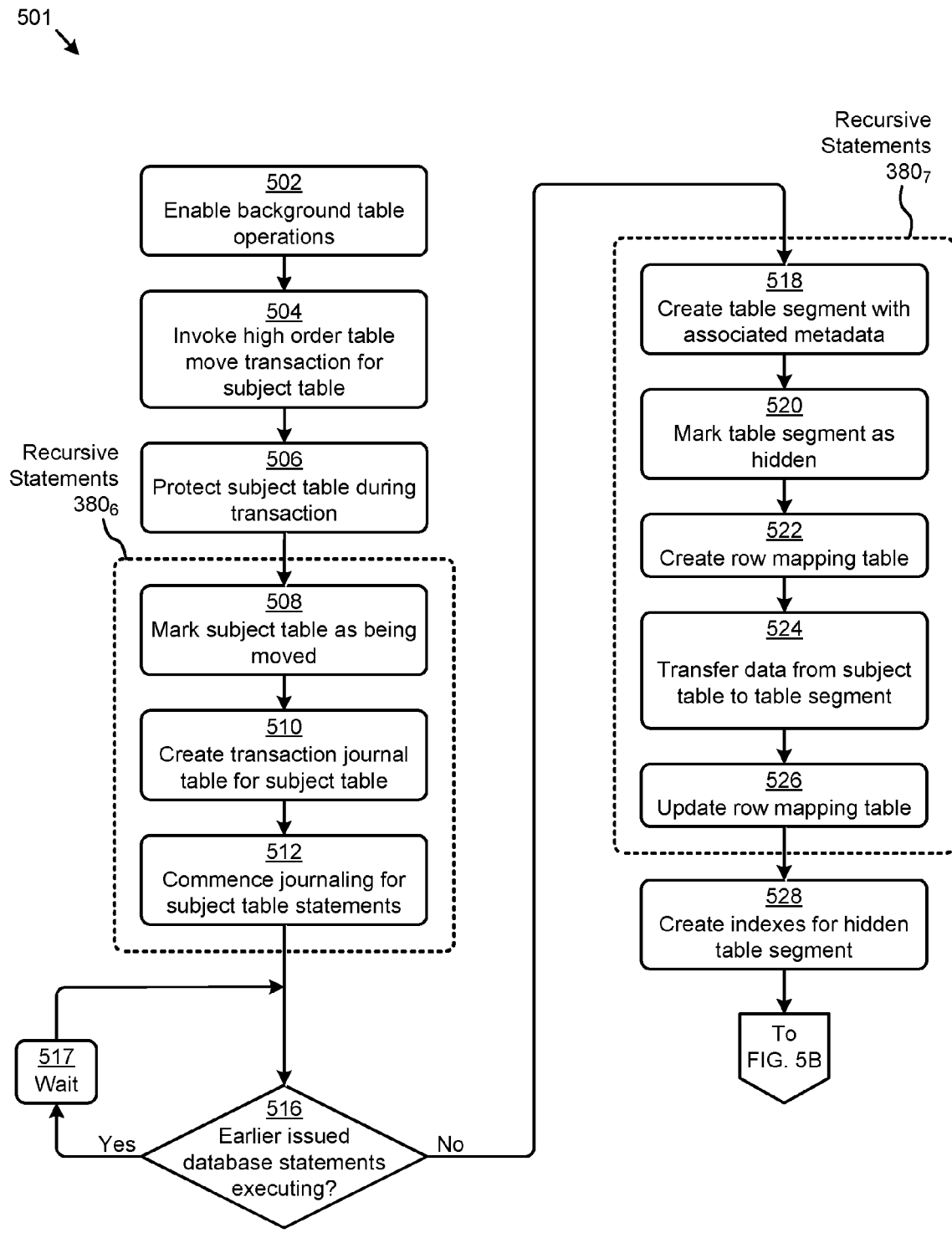
FIG. 5A and FIG. 5B depict a table move technique as implemented in systems that perform non-blocking database table alteration, according to some embodiments.
Figure 5B:
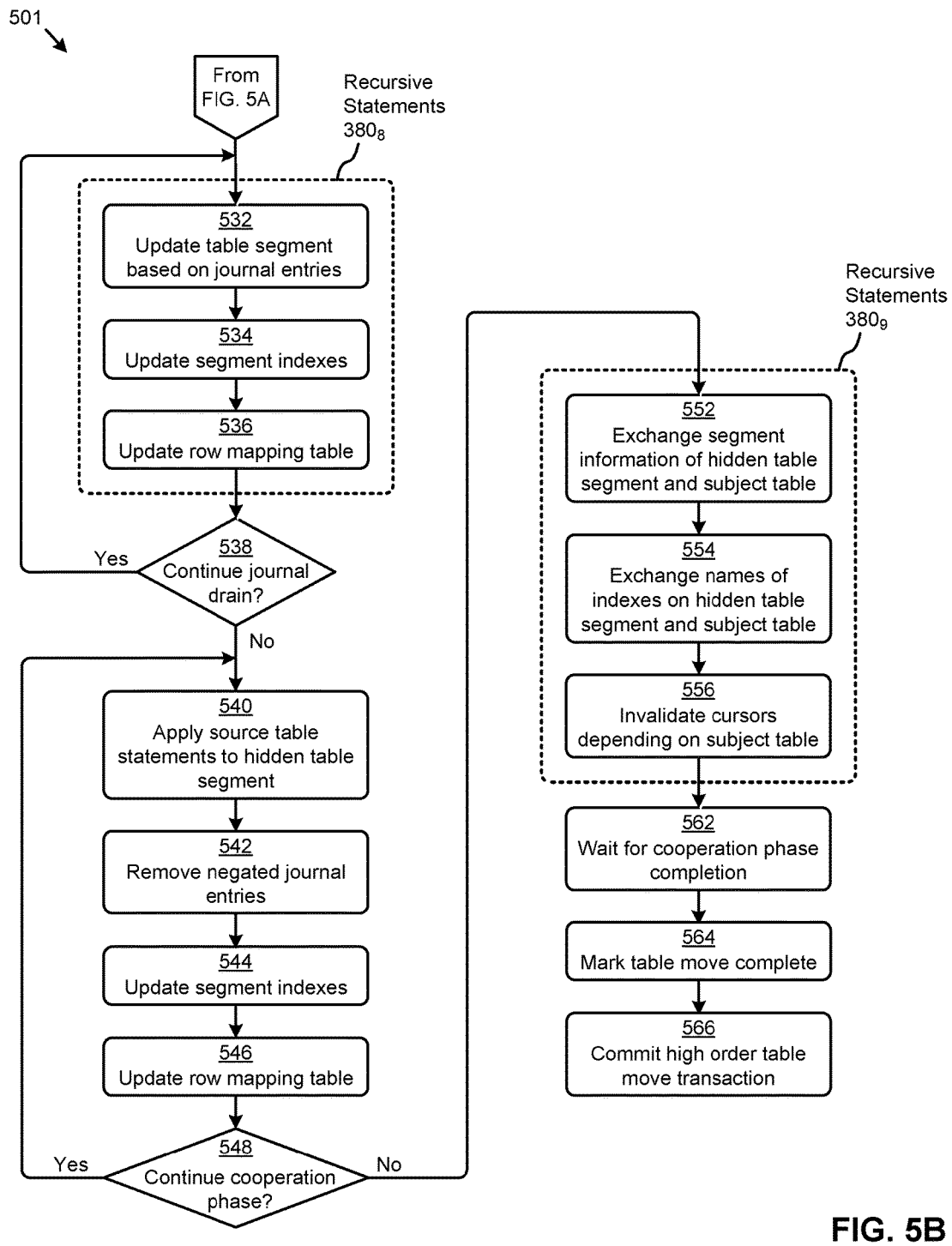

Further details pertaining to a table move technique facilitated by the herein disclosed techniques is described in FIG. 5A and FIG. 5B.

FIG. 5A and FIG. 5B depicts a table move technique 501 as implemented in systems that perform non-blocking database table alteration. As an option, one or more variations of table move technique 501 or any aspect thereof may be implemented in the context of the architecture and functionality of the embodiments described herein. The table move technique 501 or any aspect thereof may be implemented in any environment.

FIG. 5A presents one embodiment of a set of steps and/or operations for moving a data table using the herein disclosed techniques for non-blocking database table alteration. In one or more embodiments, the steps and underlying operations shown in FIG. 5A can be executed by program instructions stored on a database management server such as the database management server 110 described in FIG. 1B. Specifically, the flow in FIG. 5A can commence with enabling certain background table operations (at step 502). For example, changes to parser code at the database management server might be implemented to facilitate internal execution of certain table modify operations. A high order statement invoking a table move transaction for a subject table might then be received (at step 504). For example, pseudo-code lines 9-12 in Table 4 might represent such a high order statement.

Upon invoking the table move transaction for the subject table, certain protections pertaining to the subject table can be implemented (at step 506). For example, a sub-exclusive or SX DML, lock and/or an exclusive or X DDL enqueue on the subject table might be implemented to, in part, prevent other online DDL transactions on the subject table. In most cases, the SX lock can allow other transactions to query, insert, update, delete, and/or lock rows concurrently on the subject table. Further, SX locks can allow multiple transactions to obtain concurrent SX and/or sub-share or SS locks for the subject table. The table move transaction can continue with a set of recursive statements $380_6$ for executing variation operations. Specifically, the recursive statements $380_6$ can serve to mark the subject table as being moved (at step 508). Specifically, for example, certain metadata might be updated to indicate the subject table is being modified (e.g., moved) online. Further, a transaction journal can be created for the subject table (at step 510). For example, the journal table might capture the row identifier (e.g., rowID) and opcode of various processes associated with the subject table. The recursive statements $380_6$ can be committed when the subject table has been marked to commence journaling of subject table activity (at step 512). For example, any DML statements pertaining to the subject table can be captured in the journal table. In some cases, certain database statements (e.g., DML statements) might have been issued prior to the invoking of the table move transaction. If one or more of such database transactions are still executing (see "Yes" path of decision 516), a wait period can be implemented (at step 517) until the execution of such database statements has completed (see "No" path of decision 516).

The table move transaction can continue with a set of recursive statements $380_7$ for executing variation operations. Specifically, the recursive statements $380_7$ can serve to create a table segment characterized by metadata (at step 518). For example, the table segment can be described by metadata in a dictionary table. In some embodiments, the table segment can be marked in the metadata as hidden (at step 520). The hidden status can disallow certain SQL queries and/or DDL statements on the hidden working table. Further, in some cases, no direct DML, statements will be allowed on the hidden working table. To facilitate the transfer of data from the subject table to the table segment, a row mapping table can be created (at step 522). For example, the row mapping table might have a first column for the source table rowID and a second column for the corresponding working table rowID. As data is transferred (e.g., by row, groups of rows, etc.) from the subject table to the working table (at step 524), the row mapping table can be updated (at step 526). The efficiency of lookups on the row mapping table can be improved by maintaining an index on the row mapping table. In some cases, for example, a direct load from the subject table to the table segment can be implemented. In such cases, certain types of compression and/or clustering can be transferred to the table segment (e.g., see line 11 in Table 4).

When the recursive statements $380_7$ are committed, segment indexes on the table segment can be created (at step 528). In certain embodiments, such segment indexes can index the hidden table segment, but not index the subject table. In some cases, the segment indexes can be created using concurrent (e.g., parallel) recursive transactions comprising CREATE index statements. For example, the creation of the segment indexes might be facilitated, in part, by filling a certain portion of the table associated with the table segment with various properties of the hidden table segment stored in metadata (e.g., the dictionary table). In other cases, certain logic can automatically determine various index attributes (e.g., partitioning type, etc.). The structure of the segment indexes can also be derived in part from the user specifications (e.g., in an UPDATE indexes statement). In certain embodiments, the segment indexes can be hidden and/or invisible and/or given a system-generated name. As such, both the table segment and corresponding segment indexes can be hidden and not available for user issued queries and/or data manipulation statements). However, in such cases, the table segment and/or segment indexes can be accessed internally to carry out various operations pertaining to the table move transaction. As an example, the segment indexes might take certain locks (e.g., an S DML, lock), but not take other locks (e.g., an SS DML lock).

Referring now to FIG. 5B, the figure presents one embodiment of a set of steps and/or operations for moving a data table using the herein disclosed techniques for non-blocking database table alteration. In one or more embodiments, the steps and underlying operations shown in FIG. 5B can be executed by program instructions stored on a database management server, such as the database management server 110 described in FIG. 1B. Further, Table 4 presents a set of example pseudo-code that includes a high order statement (e.g., see lines 9-14) that can invoke a table move transaction that might include the steps and/or operations shown in FIG. 5B.

Specifically, as shown in FIG. 5B, the table move transaction can continue with a set of recursive statements $380_8$ for executing variation operations. Specifically, the recursive statements $380_8$ can serve to update the table segment based on the journal entries (at step 532). For example, recursive SQL statements can be used to delete from and/or insert into the table segment based on the contents of the journal table. Example pseudo-code representing such delete and insert operations are shown in Table 5. In some cases, the SQL statements can specify various attributes of the table segment. In some cases, certain rows might be designated as locked in the journal, resulting in updates for such locked rows being ignored. In certain embodiments, the segment indexes associated with the table segment can also be maintained responsive to any table segment updates (at step 534). Further, the row mapping table can be maintained so as to be consistent with any table segment updates (at step 536).

TABLE 5

Table segment update pseudo-code example

| Ref | Pseudo-Code |
|---|---|
| 0 | /* Insert Data Into Table Segment */ |
| 1 | INSERT into <table segment> |
| 2 |   SELECT * from <subject table> |
| 3 |     WHERE rowID =: <rowID from journal>; |
| 4 | /* Delete Data From Table Segment */ |
| 5 | DELETE from <table segment> |
| 6 |   WHERE rowID = ( |
| 7 |     SELECT <table segment rowID> from <row mapping table> |
| 8 |     WHERE <subject table rowID> =: <rowID from journal>); |

The "journal drain" facilitated by the recursive statements $380_8$ can be repeated (see "Yes" path of decision 538) until the table segment and any associated segment indexes become synchronized with the subject table and any associated subject indexes. In some cases, the number of rows processed in each iteration of the recursive statements $380_8$ can be actively managed to maximize transaction efficiency. When no further journal drain iterations are needed (see "No" path of decision 538), the final instance of the recursive statements $380_8$ can be committed to launch a "cooperation phase" that can commence with subject table database statements being applied to the table segment (at step 540). For example, database statements (e.g., DML, statements) issued on the subject table can be internally applied to the table segment using a certain setting (e.g., "_use_hidden_table_segment"). In some cases, any database statements that might negate a journal entry can cause the journal entry to be removed (at step 542).

Further, the segment indexes (e.g., unique indexes, non-unique indexes, etc.) and/or the row mapping table can be maintained during the cooperation phase (at step 544 and step 546, respectively). While user database statements on the subject table can be applied to the table segment during the cooperation phase, the table segment and associated segment indexes remain hidden, preventing the user from issuing database statements directly on the table segment. In certain cases, the cooperation phase can continue (see "Yes" path of decision 548) until all table segment updates based on journal entries have been completed (e.g., the journal has been "drained"). In some cases, the cooperation phase might continue until updates associated with certain locked rows have been processed.

When the cooperation phase is complete (see "No" path of decision 548), a set of recursive statements $380_9$ can be used to execute variation operations. Specifically, the recursive statements $380_9$ can serve to exchange certain attributes of the table segment and segment indexes, with certain attributes of the subject table and subject indexes, to generate a moved table with moved indexes. For example, dictionary changes (e.g., table metadata changes) to swap the segment information (e.g., data location pointers) of the source table and table segment can be implemented (at step 552). Also, other dictionary changes (e.g., index table changes) to swap the names of the source indexes and segment indexes can be implemented (at step 554). Such metadata changes and/or other changes can produce the moved table and moved indexes that reference the object number of the subject table and subject indexes, respectively. In this case, certain database statements configured to operate on the subject table and/or subject indexes can be applied to the moved table and/or moved indexes. Further, certain auxiliary objects (e.g., constraints, triggers, etc.) configured for the subject table and/or subject indexes can also be applied to the moved table and/or moved indexes. In some cases, the moved table can be marked as active (e.g., from hidden). Also, the subject table can be marked as hidden (e.g., from active). In certain embodiments, certain cursors depending on the subject table can be invalidated (at step 556) before the recursive statements $380_9$ can be committed.

When all database statements (e.g., DML, statements) issued during the cooperation phase have completed (at step 562), the moved table can be marked (e.g., in table metadata) to indicate table modification (e.g., table move) is complete (at step 564). The high order table move transaction can then be committed (at step 566). For example, the commit might comprise releasing table locks, signaling user applications, cleaning up failures, and/or other operations associated with the completion of the table move transaction.

Additional Embodiments of the Disclosure

Additional Practical Application Examples

Figure 6A:
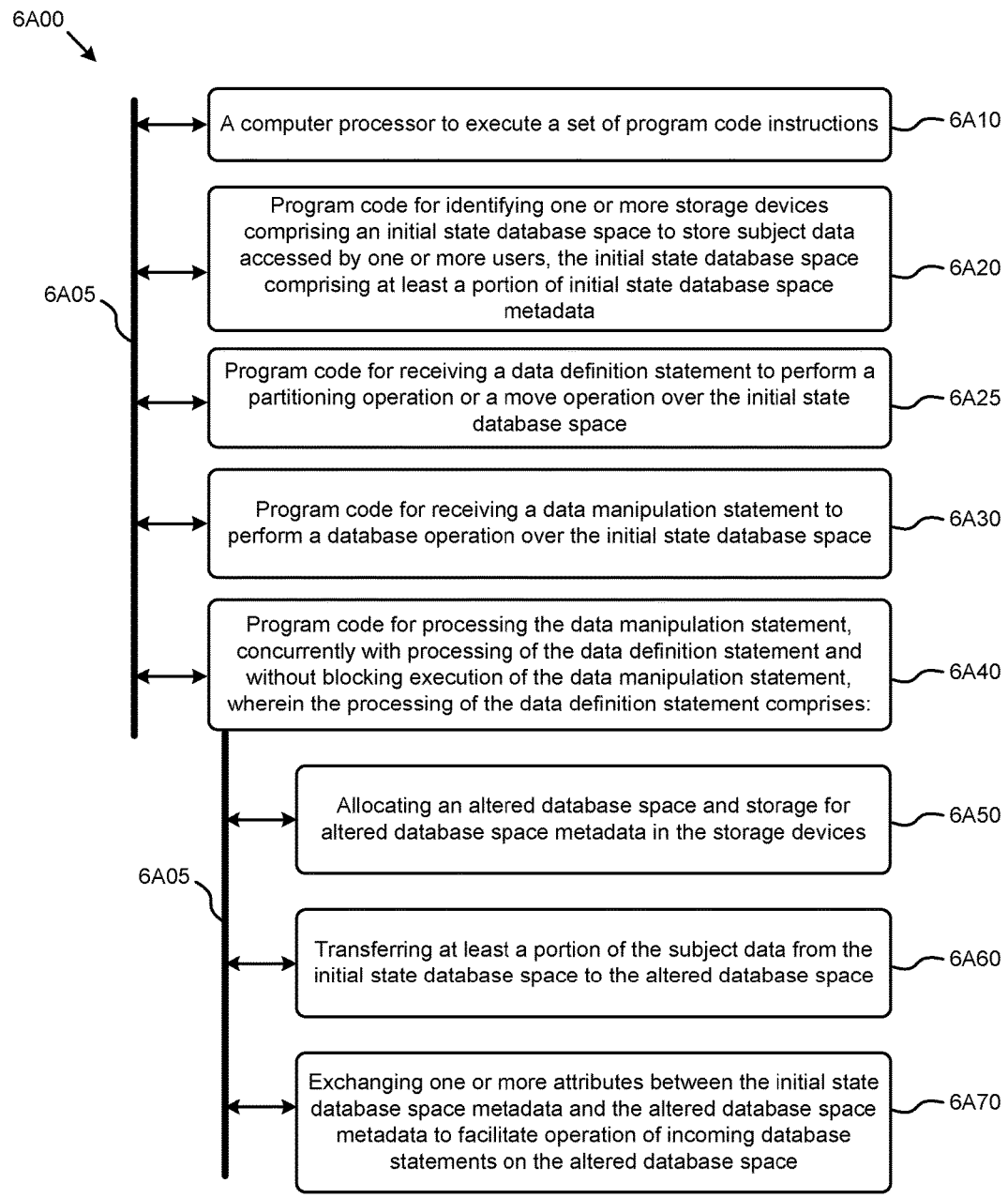
FIG. 6A, and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment. The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims. The shown embodiment implements a portion of a computer system, presented as system 6A00, comprising a computer processor to execute a set of program code instructions (module 6A10) and modules for accessing memory to hold program code instructions to perform: identifying one or more storage devices comprising an initial state database space to store subject data accessed by one or more users, the initial state database space comprising at least a portion of initial state database space metadata (module 6A20); receiving a data definition statement to perform a partitioning operation or a move operation over the initial state database space (module 6A25); receiving a data manipulation statement to perform a database operation over the initial state database space (module 6A30); and processing the data manipulation statement, concurrently with processing of the data definition statement and without blocking execution of the data manipulation statement (module 6A40). As shown, the aforementioned processing of the data definition statement comprises: allocating an altered database space and storage for altered database space metadata in the storage devices (module 6A50); transferring at least a portion of the subject data from the initial state database space to the altered database space (module 6A60); and exchanging one or more attributes between the initial state database space metadata and the altered database space metadata to facilitate operation of incoming database statements on the altered database space (module 6A70).

Variations of the foregoing may include more or fewer of the shown modules and variations may perform more or fewer (or different) steps, and/or may use data elements in more, or in fewer, or different operations.

Some embodiments include variations that further comprise steps for generating one or more working indexes associated with the altered database space;

Some embodiments include variations where exchanging the one or more attributes further facilitates the operating of the incoming database statements on the working indexes;

Some embodiments include variations where the working indexes are hidden from incoming database queries;

Some embodiments include variations that further comprise steps for updating the working indexes responsive to an incoming database manipulation statement;

Some embodiments include variations where one or more of the working indexes are generated concurrently;

Some embodiments include variations where generating the working indexes further comprise steps for determining an index type;

Some embodiments include variations where the index type corresponds to at least one of, a local index, a global index, a local partitioned index, a global partitioned index, a local prefixed index, a local non-prefixed index, or a global prefixed index; and Some embodiments include variations that further comprise steps for identifying one or more auxiliary attributes associated with the initial state database space; and steps for applying the auxiliary attributes to the altered database space to facilitate processing incoming database statements on the altered database space;

Some embodiments include variations that further comprise steps for updating at least some of the portion of the subject data in the altered database space responsive an incoming database statement;

Some embodiments include variations where the altered database space is hidden from incoming database statements;

Some embodiments include variations where the altered database space is at least one of, a data table, a table partition, or a table segment;

Some embodiments include variations where the attributes comprise at least one of, an object number, an object identifier, a repository identifier, a base object number, or a name; and Some embodiments include variations where the database statements comprise at least one of, a SQL query, a DDL statement, or a DML, statement.

Figure 6B:
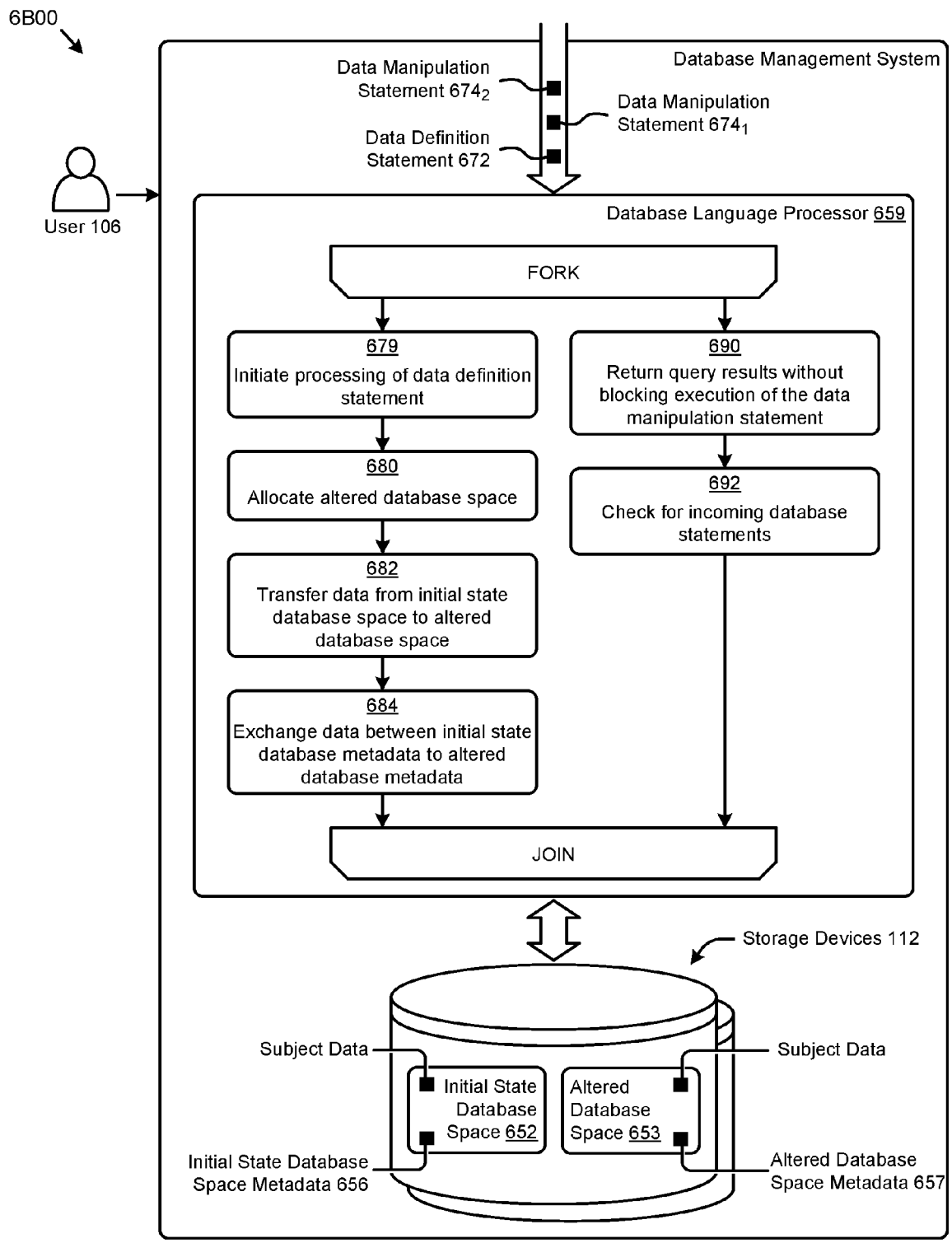

FIG. 6B depicts a system 6B00 as an arrangement of computing modules that are interconnected so as to operate cooperatively to implement certain of the herein-disclosed embodiments. The partitioning of system 6B00 is merely illustrative and other partitions are possible. As shown, system 6B00 comprises one or more storage devices 112 that comprise an initial state database space 652 to store subject data that is accessed by one or more users. The initial state database space 652 further comprises initial state database space metadata 656.

A database language processor 659 receives a data definition statement 672 to perform a table partitioning operation or a table move operation over the initial state database space. Processing of the data definition statement 672 is spawned (e.g., in a fork-join block) so as to proceed concurrently during processing of a received instance of a data definition statement. In exemplary embodiments, an incoming instance of a data manipulation statement $674_1$ performs one or more database operations over the same initial state database space. The steps included in the fork-join block include processing the data manipulation statement, concurrently with processing of the data definition statement without blocking execution of the data manipulation statement.

As shown on the left side of the fork-join block, the processing of the data definition statement is initiated at step 679 and further comprises a step 679 for allocating (e.g., in the storage devices 112) areas to be used as an altered database space 653 and allocating (at step 680) areas to be used as storage for altered database space metadata 657. Using the techniques described herein, processing of the data definition statement further comprises transferring subject data from the initial state database space to the altered database space (at step 682); and still further comprises exchanging (at step 684) one or more attributes between the initial state database space metadata 656 and the altered database space metadata 657 to facilitate operation of additional incoming database statements (e.g., data manipulation statement $674_2$) on the altered database space.

As shown on the right side of the fork-join block, the processing of the data manipulation statement comprises steps for returning results without blocking execution of the data manipulation statement (at step 690), and steps for checking for additional incoming database statements (at step 692).

System Architecture Overview

Additional System Architecture Examples

Figure 7:
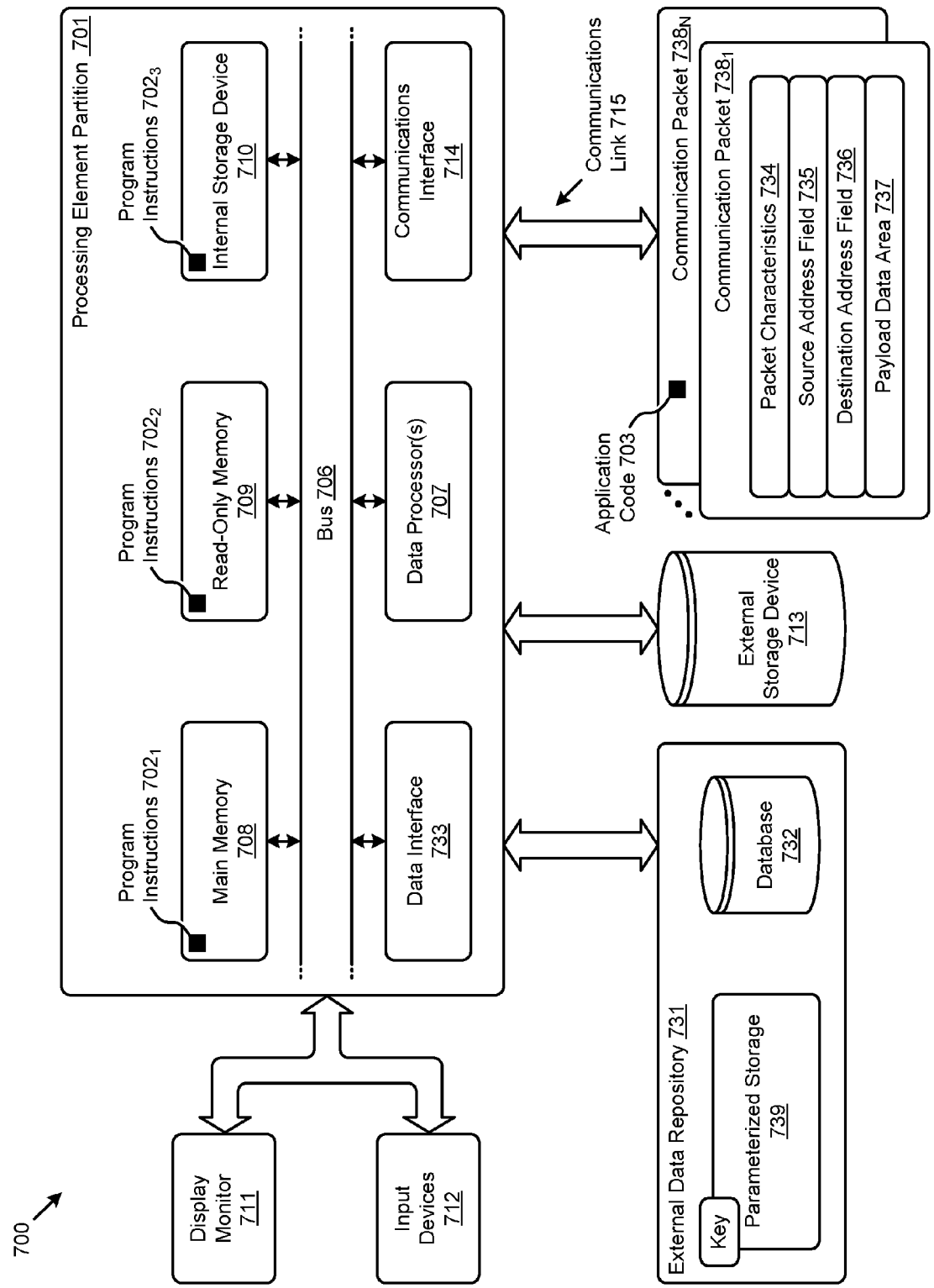
FIG. 7 depict and exemplary architecture of components suitable for implementing embodiments of the present disclosure and/or for use in the herein-described environments.

FIG. 7 depicts a block diagram of an instance of a computer system 700 suitable for implementing embodiments of the present disclosure. Computer system 700 includes a bus 706 or other communication mechanism for communicating information. The bus interconnects subsystems and devices such as a CPU, or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. The shown computer system 700 further comprises a display 711 (e.g., CRT or LCD), various input devices 712 (e.g., keyboard, cursor control), and an external data repository 731.

According to an embodiment of the disclosure, computer system 700 performs specific operations by data processor 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 700 performs specific networking operations using one or more instances of communications interface 714. Instances of the communications interface 714 may comprise one or more networking ports that are configurable (e.g., pertaining to speed, protocol, physical layer characteristics, media access characteristics, etc.) and any particular instance of the communications interface 714 or port thereto can be configured differently from any other particular instance. Portions of a communication protocol can be carried out in whole or in part by any instance of the communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

The communications link 715 can be configured to transmit (e.g., send, receive, signal, etc.) any types of communications packets comprising any organization of data items. The data items can comprise a payload data area 737, a destination address (e.g., a destination IP address), a source address (e.g., a source IP address), and can include various encodings or formatting of bit fields to populate the shown packet characteristics 734. In some cases the packet characteristics include a version identifier, a packet or payload length, a traffic class, a flow label, etc. In some cases the payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of the computer system 700. According to certain embodiments of the disclosure, two or more instances of computer system 700 coupled by a communications link 715 (e.g., LAN, PTSN, or wireless network) may perform the sequence of instructions required to practice embodiments of the disclosure using two or more instances of components of computer system 700.

The computer system 700 may transmit and receive messages such as data and/or instructions organized into a data structure (e.g., communications packets). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 700 may communicate through a data interface 733 to a database 732 on an external data repository 731. Data items in a database can be accessed using a primary key (e.g., a relational database primary key).

The processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). A module may include one or more state machines and/or combinational logic used to implement or facilitate the operational and/or performance characteristics of systems that perform non-blocking database table alteration operations.

Various implementations of the database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of non-blocking database table alterations). Such files or records can be brought into and/or stored in volatile or non-volatile memory.

In the foregoing specification, the disclosure has been described with reference to specific embodiments thereof. It will however be evident that various modifications FIG. 7 depicts a block diagram of an instance of a computer system 700 suitable for implementing embodiments of the present disclosure. Computer system 700 includes a bus 706 or other communication mechanism for communicating information. The bus interconnects subsystems and devices such as a CPU, or a multi-core CPU (e.g., data processors 707), a system memory (e.g., main memory 708, or an area of random access memory), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. The shown computer system 700 further comprises a display 711 (e.g., CRT or LCD), various input devices 712 (e.g., keyboard, cursor control), and an external data repository 731.

According to an embodiment of the disclosure, computer system 700 performs specific operations by data processors 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 700 performs specific networking operations using one or more instances of communications interface 714. Instances of the communications interface 714 may comprise one or more networking ports that are configurable (e.g., pertaining to speed, protocol, physical layer characteristics, media access characteristics, etc.) and any particular instance of the communications interface 714 or port thereto can be configured differently from any other particular instance. Portions of a communication protocol can be carried out in whole or in part by any instance of the communications interface 714, and data (e.g., packets, data structures, bit fields, etc.) can be positioned in storage locations within communications interface 714, or within system memory, and such data can be accessed (e.g., using random access addressing, or using direct memory access (DMA), etc.) by devices such as data processors 707.

The communications link 715 can be configured to transmit (e.g., send, receive, signal, etc.) any types of communications packets (e.g., communications packet $738_1$, ..., communications packet $738_N$) comprising any organization of data items. The data items can comprise a payload data area 737, a destination address field 736 (e.g., a destination IP address), a source address field 735 (e.g., a source IP address), and can include various encodings or formatting of bit fields to populate the shown packet characteristics 734. In some cases the packet characteristics include a version identifier, a packet or payload length, a traffic class, a flow label, etc. In some cases the payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processors 707 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of the computer system 700. According to certain embodiments of the disclosure, two or more instances of computer system 700 coupled by a communications link 715 (e.g., LAN, PTSN, or wireless network) may perform the sequence of instructions required to practice embodiments of the disclosure using two or more instances of components of computer system 700.

The computer system 700 may transmit and receive messages such as data and/or instructions organized into a data structure (e.g., communications packets). The data structure can include program instructions (e.g., application code 703), communicated through communications link 715 and communications interface 714. Received program code may be executed by data processors 707 as it is received and/or stored in the shown storage device, or in or upon any other non-volatile storage for later execution. Computer system 700 may communicate through a data interface 733 to a database 732 on an external data repository 731. Data items in a database can be accessed using a primary key (e.g., a relational database primary key).

The processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of systems that perform automatic overrides of database statistics gathering commands.

Various implementations of the database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of performing automatic overrides of database statistics gathering commands). Such files or records can be brought into and/or stored in volatile or non-volatile memory.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
identifying one or more storage devices comprising an initial state database space to store subject data accessed by one or more users, the initial state database space comprising at least a portion of initial state database space metadata;
receiving a data definition statement to perform a table partitioning operation or a table move operation over a first table in the initial state database space;
receiving a data manipulation statement to perform a database operation over the first table; and
processing the data manipulation statement pertaining to the first table while concurrently processing the data definition statement over the first table without blocking execution of the data manipulation statement by:
creating a second table, wherein the table partitioning operation or the table move operation is performed on the second table while access to the first table is still provided to the one or more users,
allocating an altered database space for the second table and storage for altered database space metadata in the storage devices,
transferring at least a portion of the subject data from the initial state database space to the altered database space,
exchanging one or more attributes between the initial state database space metadata and the altered database space metadata to facilitate operation of incoming database statements on the altered database space, and
upon completion of the table partitioning operation or the table move operation on the second table, transitioning user access from the first table to the second table.

2. The method of claim 1, further comprising generating one or more working indexes associated with the altered database space.

3. The method of claim 2, wherein the one or more working indexes are hidden from incoming database queries.

4. The method of claim 2, further comprising updating the one or more working indexes responsive to an incoming database manipulation statement.

5. The method of claim 2, wherein the one or more of the working indexes are generated concurrently.

6. The method of claim 2, wherein generating the one or more working indexes further comprises determining an index type.

7. The method of claim 6, wherein the index type corresponds to at least one of, a local index, a global index, a local partitioned index, a global partitioned index, a local prefixed index, a local non-prefixed index, or a global prefixed index.

8. The method of claim 1, further comprising: identifying one or more additional attributes associated with the initial state database space; and applying the additional attributes to the altered database space to facilitate processing incoming database statements on the altered database space.

9. The method of claim 1, wherein the altered database space is hidden from incoming database statements.

10. The method of claim 1, further comprising: creating a journal table for the first table; and capturing data manipulation language statements processed at the first table into the journal table once the processing of the data definition statement begins.

11. The method of claim 1, wherein the one or more attributes comprise at least one of, an object number, an object identifier, a repository identifier, a base object number, or a name.

12. The method of claim 1, wherein the incoming database statements comprise at least one of, a SQL query, a data definition language (DDL) statement, or a data manipulation language (DML) statement.

13. A computer readable medium, embodied in a non-transitory computer readable medium, the non-transitory computer readable medium having stored thereon a sequence of instructions which, when stored in memory and executed by one or more processors causes the one or more processors to perform a set of acts, the acts comprising:
identifying one or more storage devices comprising an initial state database space to store subject data accessed by one or more users, the initial state database space comprising at least a portion of initial state database space metadata;
receiving a data definition statement to perform a table partitioning operation or a table move operation over a first table in the initial state database space;
receiving a data manipulation statement to perform a database operation over the first table; and
processing the data manipulation statement pertaining to the first table while concurrently processing the data definition statement over the first table without blocking execution of the data manipulation statement by:
creating a second table, wherein the table partitioning operation or the table move operation is performed on the second table while access to the first table is still provided to the one or more users,
allocating an altered database space for the second table and storage for altered database space metadata in the storage devices,
transferring at least a portion of the subject data from the initial state database space to the altered database space,
exchanging one or more attributes between the initial state database space metadata and the altered database space metadata to facilitate operation of incoming database statements on the altered database space, and
upon completion of the table partitioning operation or the table move operation on the second table, transitioning user access from the first table to the second table.

14. The computer readable medium of claim 13, further comprising instructions which, when stored in memory and executed by the one or more processors causes the one or more processors to perform acts of generating one or more working indexes associated with the altered database space.

15. The computer readable medium of claim 14, wherein the one or more working indexes are hidden from incoming database queries.

16. The computer readable medium of claim 14, further comprising instructions which, when stored in memory and executed by the one or more processors causes the one or more processors to perform acts of updating the one or more working indexes responsive to an incoming database manipulation statement.

17. A system comprising:
a storage medium having stored thereon a sequence of instructions; and one or more processors that execute the instructions to cause the one or more processors to perform a set of acts, the acts comprising,
identifying one or more storage devices comprising an initial state database space to store subject data accessed by one or more users, the initial state database space comprising at least a portion of initial state database space metadata;

receiving a data definition statement to perform a table partitioning operation or a table move operation over a first table in the initial state database space;

receiving a data manipulation statement to perform a database operation over the first table;

and processing the data manipulation statement pertaining to the first table while concurrently processing the data definition statement over the first table without blocking execution of the data manipulation statement by:

creating a second table, wherein the table partitioning operation or the table move operation is performed on the second table while access to the first table is still provided to the one or more users, allocating an altered database space for the second table and storage for altered database space metadata in the storage devices, transferring at least a portion of the subject data from the initial state database space to the altered database space, exchanging one or more attributes between the initial state database space metadata and the altered database space metadata to facilitate operation of incoming database statements on the altered database space, and upon completion of the table partitioning operation or the table move operation on the second table, transitioning user access from the first table to the second table.

\* \* \* \* \*